US012523200B2

(12) United States Patent
Vasconcelos da Costa et al.

(10) Patent No.: US 12,523,200 B2
(45) Date of Patent: Jan. 13, 2026

(54) MICRO SCALABLE THRUSTERS FOR ADAPTIVE MISSION PROFILES IN SPACE—µSTAMPS

(71) Applicant: University of Tennessee Research Foundation, Knoxville, TN (US)

(72) Inventors: Jose Lino Vasconcelos da Costa, Tullahoma, TN (US); Trevor Michael Moeller, Manchester, TN (US); Justin Michael Jones, Cleveland, TN (US); Brian Keith Canfield, Tullahoma, TN (US); Alexander Yuryevich Terekhov, Hermitage, TN (US); Joshua Harrison Howell, Franklin, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 672 days.

(21) Appl. No.: 17/548,446

(22) Filed: Dec. 10, 2021

(65) Prior Publication Data

US 2022/0194633 A1    Jun. 23, 2022

Related U.S. Application Data

(60) Provisional application No. 63/127,768, filed on Dec. 18, 2020.

(51) Int. Cl.
*F03H 1/00*      (2006.01)
*B64G 1/40*     (2006.01)

(52) U.S. Cl.
CPC .......... *F03H 1/0037* (2013.01); *B64G 1/413* (2023.08)

(58) Field of Classification Search
CPC ................................ B64G 1/413; F03H 1/005
See application file for complete search history.

(56) References Cited

PUBLICATIONS

Dandavino "Design and fabrication of the thruster heads for the Micro Thrust MEMS electrospray propulsion system" (Year: 2013).*
Dandavino "Progress Towards a Miniaturized Electrospray Thruster for Propulsion of Small Spacecraft" (Year: 2012).*
Ackerman "Ion Electrospray Engines Could Take Cubesats to the Moon and Beyond" (Year: 2015).*

(Continued)

*Primary Examiner* — David P. Olynick
(74) *Attorney, Agent, or Firm* — JENKINS, TAYLOR & HUNT, P.A.

(57) ABSTRACT

One or more electrospray emitters form an electrospray thruster, suitable for generating thrust for maneuvering and/or moving a structure to which the thruster is attached in three-dimensional space. The thruster includes a reservoir containing a fluid, preferably an ionic liquid (IL) fluid. Each electrospray emitter includes a dielectric, with channel(s) formed through a thickness thereof, and an extraction electrode, preferably an extraction grid, on an opposite side of the dielectric from the reservoir. Upon application of a sufficient electric potential differential between the extraction electrode and the fluid, the fluid flows through the channels from the reservoir, forms a Taylor cone at an outlet of each channel, and is ejected in the direction of the extraction grid to generate a thrust by the thruster for movement and/or maneuvering of the structure to which the thruster is attached.

20 Claims, 11 Drawing Sheets

(56) References Cited

PUBLICATIONS

Jones, J.M., "The Effects of Geometry and Material Variations on the Onset Voltage of Electrospray Emitters", A Thesis Presented for the Master of Science Degree, The University of Tennessee, Knoxville, published Dec. 11, 2020, pp. 86.

An et al., "Water-assisted femtosecond laser machining of electrospray nozzles on glass microfluidic devices," Optics Express vol. 16(19), 6 pages (2008).

Jones et al., "Numerical investigation of the effects of geometry and materials on the onset voltage of electrospray emitters." Journal of Electrostatics, vol. 108, Article ID 103487, 25 pages (2020).

Kimber et al., "Dielectric Materials with Deposited Electrode layers for Electrospray Arrays," AIAA Propulsion and Energy Forum—2018 Joint Propulsion Conference, Cincinnati, Ohio, 13 pages, Jul. 9-11, 2018.

Paine et al., "A Micro-Fabricated Colloidal Thruster Array," In 37th Joint Propulsion Conference and Exhibit, American Institute of Aeronautics and Astronautics, AIAA-2001-3329, Salt Lake City, Utah, 10 pages, Jul. 2001.

Paine et al., "Realisation of very high voltage electrode-nozzle systems for MEMS." Sensors and Actuators A: Physical, vol. 114(1), pp. 112-117 (2004).

Ramsey et al., "Generating Electrospray from Microchip Devices Using Electroosmotic Pumping." Anal. Chem., vol. 69, pp. 1174-1178 (1997).

Schilling et al., "A new on-chip ESI nozzle for coupling of MS with microfluidic devices." Lab Chip, vol. 4, pp. 220-224 (2004).

Schultz et al., "A Fully Integrated Monolithic Microchip Electrospray Device for Mass Spectrometry." Anal. Chem., vol. 72, pp. 4058-4063 (2000).

Siegel, Silicon Wafer Integration of Ion Electrospray Thruststers, Master's Thesis, MIT, 158 pages, May 2020.

Xue et al., "Multichannel Microchip Electrospray Mass Spectrometry." Anal. Chem., vol. 69, pp. 426-430 (1997).

\* cited by examiner

MICRO SCALABLE THRUSTERS FOR ADAPTIVE MISSION PROFILES IN SPACE—μSTAMPS

CROSS-REFERENCE TO RELATED APPLICATIONS

This application claims the benefit of and priority to U.S. Provisional Patent Application Ser. No. 63/127,768, which was filed on Dec. 18, 2020, the disclosure of which is incorporated by reference herein in its entirety.

GOVERNMENT INTEREST

This invention was made with government support under award number 80NSSC19C0548, awarded by the National Aeronautics and Space Administration. The government has certain rights in the invention.

TECHNICAL FIELD

The subject matter disclosed herein relates generally to electrospray emitter devices. More particularly, the subject matter disclosed herein relates to the use of such electrospray emitters as thrusters for moving and/or maneuvering objects to which such thrusters are attached, including in ambient environments where there is no, or only negligible, ambient barometric pressure (e.g., in a vacuum), such as in space.

BACKGROUND

Electrospray is a liquid atomization process that uses electrostatic forces to eject and spray an electrically conductive liquid to produce an accelerated aerosol of electrically charged fine droplets, which can, in some instances, be ions. Electrospray is known to be suitable for use as an ionization source for mass spectrometry, as a liquid metal ion source in focused ion beam instruments, and in field-emission electric propulsion (FEEP) ion thrusters. In recent years, electrospray of ionic liquid (IL) propellants has begun to be explored as an electric micro-propulsion technology for micro- and nano-satellites. In such applications, electrospray thrusters accelerate ions through an applied electric field, and the resulting stream of high-velocity ions is ejected to generate thrust. Ionic liquids have some extraordinary properties that make them ideal propellants for electrospray thrusters. In short, ILs are salts with melting points less than 100° C. Being entirely composed of ions, ILs are naturally electrically conductive and, as such, suitable for use in electrospray applications. The presence of both cations and anions within the IL allows an electrospray thruster to be sequentially operated at opposite polarities, which prevents electrical charging of the structure being propelled (e.g., such as a spacecraft) and eliminates the need for producing neutralizing electron beams using charge neutralizers. In addition, IL propellants are typically inert, stable, and can be stored in unpressurized reservoirs and used in low-pressure atmospheric conditions, such as in a vacuum, where ambient pressure is substantially zero, such as is commonly known to be prevalent in outer space, hence the phrase "the vacuum of space;" such ILs are capable of storage and use in such atmospheric conditions without substantial evaporation losses, given the extremely low vapor pressures of such ILs.

Deliberate, controlled, and stable electrospray is presently known to occur at the tip of a sharp emitter capable of enhancing the strength of the local electric field. To achieve appreciable thrust, on the order of a few tens of micronewtons (μN), and lessen the effects of defective emitters, arrays of hundreds or even thousands of micro-emitters are needed on a single thruster. Typically, these micro-emitters protrude from the surface of a chip directly into the surrounding environment (e.g., protruding into, and exposed to, a vacuum) and have one of three forms: (1) capillaries filled with IL; (2) solid spikes wetted externally by the IL; or (3) porous needles through which the IL diffusively seeps. An extraction grid provides a reference electric potential for establishment of the electric field required for electrospray emission and subsequent ion acceleration. Holes in the extraction grid allow for passage of electrically charged fine droplets and ions that form the thrust-generating beam.

Electrospray thrusters operate at high voltages, typically above 1 kV, in pulse mode with sequentially opposite polarities. The resulting electromagnetic interference on nearby mission-critical equipment can lead to data errors, temporary resets, and failure. Electrospray emitters with extremely sharp geometries are used to reduce the operating voltage. However, conventional protruding emitters with sufficiently sharp geometries and reduced operating voltages are not only exceedingly difficult to fabricate consistently, but also extremely fragile and highly susceptible to degradation during operation. Modes of degradation can include electrochemical corrosion, wear, direct exposure to surrounding space environment containing diverse concentrations and grades of space debris that can physically damage the emitters, and physical damage caused by the surface tension forces of the liquid propellant. As such, a need exists for an electrospray emitter design that is more structurally robust than currently known electrospray emitter designs and allows for sharper emitters with consistent geometries operating at reduced voltages. Moreover, the emitter chip and the extraction grid are typically separate elements of the thruster, meaning that at some point in the fabrication process, the emitter chip and the extraction grid need to be assembled together to form a thruster. This step involves precise alignment and bonding of the two elements. To compensate for alignment errors and possible misalignments caused by vibrations during launch or operation, the openings in the extraction grid can be made larger than optimal, thus affecting the overall performance of the thruster. As such, a need exists for an electrospray thruster design that is of monolithic, or unitary, construction, and where the geometric dimensions of all elements are optimized for performance only and as a function of the materials used.

SUMMARY

According to a first example embodiment, an electrospray thruster is provided, the electrospray thruster comprising: a reservoir containing a fluid; an electrospray emitter comprising: a dielectric comprising one or more channels formed through a thickness of the dielectric, and an extraction electrode, wherein the extraction electrode is positioned on an opposite side of the dielectric from the reservoir, in a direction of the thickness of the dielectric. A first end of each of the one or more channels is in fluidic communication, at an upstream surface of the dielectric, with the fluid contained within the reservoir. A second end of each of the one or more channels is in fluidic communication, at a downstream surface of the dielectric, with an external atmosphere surrounding the thruster. The thruster is configured such that, when an electrospray onset voltage difference is applied between the extraction electrode and the fluid, mass from the fluid is ejected from the one or more channels to generate thrust.

In some embodiments of the first example embodiments of the electrospray thruster, the fluid comprises an ionic liquid (IL) propellant.

In some embodiments of the first example embodiments of the electrospray thruster, the dielectric comprises a dielectric material with a relative permittivity of less than 12.

In some embodiments of the first example embodiments of the electrospray thruster, the electrospray onset voltage difference is less than 1,000 Volts (V).

In some embodiments of the first example embodiments of the electrospray thruster, the one or more channels are a plurality of channels arranged in an array, each of the channels being formed as a microcapillary with a length-to-width ratio of at least 100:1 and a length of the channels is at least 100 µm.

In some embodiments of the first example embodiments of the electrospray thruster, the one or more channels are a plurality of channels arranged in an array, each of the channels being formed as a microcapillary with a length-to-width ratio of at least 100:1, a length of the channels is at least 100 µm, and a spacing between adjacent channels in the array is from 0.5 to 3 times the length of the channels.

In some embodiments of the first example embodiments of the example electrospray thruster, the one or more channels are a plurality of channels arranged in an array, each of the channels being formed as a microcapillary with a length-to-width ratio of at least 100:1, a length of the channels is at least 100 µm, and the extraction electrode comprises an extraction grid.

In some embodiments of the first example embodiments of the electrospray thruster, the one or more channels are a plurality of channels arranged in an array, each of the channels being formed as a microcapillary with a length-to-width ratio of at least 100:1, a length of the channels is at least 100 µm, and the extraction electrode comprises an extraction grid, and the extraction grid comprises openings that are arranged such that each opening is positioned coaxial with a corresponding one of the plurality of channels.

In some embodiments of the first example embodiments of the electrospray thruster, the one or more channels are a plurality of channels arranged in an array, each of the channels being formed as a microcapillary with a length-to-width ratio of at least 100:1, a length of the channels is at least 100 µm, the extraction electrode comprises an extraction grid, and the dielectric comprises, for each of the plurality of channels, a surface cavity that is formed as a recess extending into the dielectric from the downstream surface, each surface cavity being coaxial with one of the plurality of channels to form a channel-surface cavity pair.

In some embodiments of the first example embodiments of the electrospray thruster, the one or more channels are a plurality of channels arranged in an array, each of the channels being formed as a microcapillary with a length-to-width ratio of at least 100:1, a length of the channels is at least 100 µm, the extraction electrode comprises an extraction grid, the dielectric comprises, for each of the plurality of channels, a surface cavity that is formed as a recess extending into the dielectric from the downstream surface, each surface cavity being coaxial with one of the plurality of channels to form a channel-surface cavity pair, and the extraction grid comprises openings that are arranged such that each opening is positioned coaxial with a corresponding channel-surface cavity pair.

In some embodiments of the first example embodiments of the electrospray thruster, the one or more channels are a plurality of channels arranged in an array, each of the channels being formed as a microcapillary with a length-to-width ratio of at least 100:1, a length of the channels is at least 100 µm, the extraction electrode comprises an extraction grid, the dielectric comprises, for each of the plurality of channels, a surface cavity that is formed as a recess extending into the dielectric from the downstream surface, each surface cavity being coaxial with one of the plurality of channels to form a channel-surface cavity pair, and the extraction grid comprises openings that are arranged such that each opening is positioned coaxial with a corresponding channel-surface cavity pair, and each of the openings of the extraction grid have a diameter that is the same as, or greater than, a diameter of the corresponding surface cavity at the downstream surface of the dielectric.

In some embodiments of the first example embodiments of the electrospray thruster, the one or more channels are a plurality of channels arranged in an array, each of the channels being formed as a microcapillary with a length-to-width ratio of at least 100:1, a length of the channels is at least 100 µm, the extraction electrode comprises an extraction grid, the dielectric comprises, for each of the plurality of channels, a surface cavity that is formed as a recess extending into the dielectric from the downstream surface, each surface cavity being coaxial with one of the plurality of channels to form a channel-surface cavity pair, and the extraction grid comprises openings that are arranged such that each opening is positioned coaxial with a corresponding channel-surface cavity pair, each of the openings of the extraction grid have a diameter that is the same as, or greater than, a diameter of the corresponding surface cavity at the downstream surface of the dielectric, for each channel, an extraction distance (d) is defined as a distance between the floor of the corresponding surface cavity and the extraction grid, and each corresponding surface cavity has a diameter (m) that is greater than 2(d) to minimize an electrospray onset voltage and an applied voltage.

In some embodiments of the first example embodiments of the electrospray thruster, the one or more channels are a plurality of channels arranged in an array, each of the channels being formed as a microcapillary with a length-to-width ratio of at least 100:1, a length of the channels is at least 100 µm, the extraction electrode comprises an extraction grid, the dielectric comprises, for each of the plurality of channels, a surface cavity that is formed as a recess extending into the dielectric from the downstream surface, each surface cavity being coaxial with one of the plurality of channels to form a channel-surface cavity pair, and the extraction grid comprises openings that are arranged such that each opening is positioned coaxial with a corresponding channel-surface cavity pair, each of the openings of the extraction grid have a diameter that is the same as, or greater than, a diameter of the corresponding surface cavity at the downstream surface of the dielectric, for each channel, an extraction distance (d) is defined as a distance between the floor of the corresponding surface cavity and the extraction grid, each corresponding surface cavity has a diameter (m) that is greater than 2(d) to minimize an electrospray onset voltage and an applied voltage, and the extraction grid is in direct contact with the downstream surface of the dielectric, in a manner of a conformal coating.

In some embodiments of the first example embodiments of the electrospray thruster, the one or more channels are a plurality of channels arranged in an array, each of the channels being formed as a microcapillary with a length-towidth ratio of at least 100:1, a length of the channels is at least 100 µm, the extraction electrode comprises an extraction grid, the dielectric comprises, for each of the plurality of channels, a surface cavity that is formed as a recess extending into the dielectric from the downstream surface, each surface cavity being coaxial with one of the plurality of channels to form a channel-surface cavity pair, and the extraction grid comprises openings that are arranged such that each opening is positioned coaxial with a corresponding channel-surface cavity pair, each of the openings of the extraction grid have a diameter that is the same as, or greater than, a diameter of the corresponding surface cavity at the downstream surface of the dielectric, for each channel, an extraction distance (d) is defined as a distance between the floor of the corresponding surface cavity and the extraction grid, and each corresponding surface cavity has a diameter (m) that is greater than 2(d) to minimize an electrospray onset voltage and an applied voltage, the extraction grid is in direct contact with the downstream surface of the dielectric, in a manner of a conformal coating, and one or more of the channels is offset from the corresponding surface cavity to produce thrust at a vector angle with components both parallel and normal to the surface of the dielectric.

In some embodiments of the first example embodiments of the electrospray thruster, the one or more channels are a plurality of channels arranged in an array, each of the channels being formed as a microcapillary with a length-to-width ratio of at least 100:1, a length of the channels is at least 100 µm, the extraction electrode comprises an extraction grid, the dielectric comprises, for each of the plurality of channels, a surface cavity that is formed as a recess extending into the dielectric from the downstream surface, each surface cavity being coaxial with one of the plurality of channels to form a channel-surface cavity pair, and the extraction grid comprises openings that are arranged such that each opening is positioned coaxial with a corresponding channel-surface cavity pair, each of the openings of the extraction grid have a diameter that is the same as, or greater than, a diameter of the corresponding surface cavity at the downstream surface of the dielectric, for each channel, an extraction distance (d) is defined as a distance between the floor of the corresponding surface cavity and the extraction grid, and each corresponding surface cavity has a diameter (m) that is greater than 2(d) to minimize an electrospray onset voltage and an applied voltage, the extraction grid is in direct contact with the downstream surface of the dielectric, in a manner of a conformal coating, one or more of the channels is offset from the corresponding surface cavity to produce thrust at a vector angle with components both parallel and normal to the surface of the dielectric, and the plurality of channels comprise at least first and second set of channels, the channels in the first set of channels having a diameter that is different from a diameter of the channels in the second set of channels to form Taylor cones at different onset voltages, thereby allowing an applied voltage to function as a throttle, or a thrust lever; and/or the plurality of surface cavities comprise at least first and second sets of surface cavities, the surface cavities in the first set of surface cavities having a diameter and/or depth that is different from a diameter and/or depth of the surface cavities in the second set of surface cavities to form Taylor cones at different onset voltages, thereby allowing the applied voltage to function as a throttle, or a thrust lever.

In some embodiments of the first example embodiments of the electrospray thruster, the one or more channels are a plurality of channels arranged in an array, each of the channels being formed as a microcapillary with a length-to-width ratio of at least 100:1, a length of the channels is at least 100 µm, the extraction electrode comprises an extraction grid, the dielectric comprises, for each of the plurality of channels, a surface cavity that is formed as a recess extending into the dielectric from the downstream surface, each surface cavity being coaxial with one of the plurality of channels to form a channel-surface cavity pair, and the extraction grid comprises openings that are arranged such that each opening is positioned coaxial with a corresponding channel-surface cavity pair, each of the openings of the extraction grid have a diameter that is the same as, or greater than, a diameter of the corresponding surface cavity at the downstream surface of the dielectric, for each channel, an extraction distance (d) is defined as a distance between the floor of the corresponding surface cavity and the extraction grid, each corresponding surface cavity has a diameter (m) that is greater than 2(d) to minimize an electrospray onset voltage and an applied voltage, and the extraction grid is in direct contact with the downstream surface of the dielectric, in a manner of a conformal coating.

In some embodiments of the first example embodiments of the electrospray thruster, the one or more channels are a plurality of channels arranged in an array, each of the channels being formed as a microcapillary with a length-to-width ratio of at least 100:1, a length of the channels is at least 100 µm, the extraction electrode comprises an extraction grid, the dielectric comprises, for each of the plurality of channels, a surface cavity that is formed as a recess extending into the dielectric from the downstream surface, each surface cavity being coaxial with one of the plurality of channels to form a channel-surface cavity pair, and the extraction grid comprises openings that are arranged such that each opening is positioned coaxial with a corresponding channel-surface cavity pair, each of the openings of the extraction grid have a diameter that is the same as, or greater than, a diameter of the corresponding surface cavity at the downstream surface of the dielectric, for each channel, an extraction distance (d) is defined as a distance between the floor of the corresponding surface cavity and the extraction grid, each corresponding surface cavity has a diameter (m) that is greater than 2(d) to minimize an electrospray onset voltage and an applied voltage, the extraction grid is in direct contact with the downstream surface of the dielectric, in a manner of a conformal coating, and one or more of the channels is offset from the corresponding surface cavity to produce thrust at a vector angle with components both parallel and normal to the surface of the dielectric.

In some embodiments of the first example embodiments of the electrospray thruster, the one or more channels are a plurality of channels arranged in an array, each of the channels being formed as a microcapillary with a length-to-width ratio of at least 100:1, a length of the channels is at least 100 µm, the extraction electrode comprises an extraction grid, the dielectric comprises, for each of the plurality of channels, a surface cavity that is formed as a recess extending into the dielectric from the downstream surface, each surface cavity being coaxial with one of the plurality of channels to form a channel-surface cavity pair, and the extraction grid comprises openings that are arranged such that each opening is positioned coaxial with a corresponding channel-surface cavity pair, each of the openings of the extraction grid have a diameter that is the same as, or greater than, a diameter of the corresponding surface cavity at the downstream surface of the dielectric, for each channel, an extraction distance (d) is defined as a distance between the floor of the corresponding surface cavity and the extraction grid, each corresponding surface cavity has a diameter (m)

that is greater than 2(d) to minimize an electrospray onset voltage and an applied voltage, the extraction grid is in direct contact with the downstream surface of the dielectric, in a manner of a conformal coating, one or more of the channels is offset from the corresponding surface cavity to produce thrust at a vector angle with components both parallel and normal to the surface of the dielectric, and the plurality of channels comprise at least first and second set of channels, the channels in the first set of channels having a diameter that is different from a diameter of the channels in the second set of channels to form Taylor cones at different onset voltages, thereby allowing the applied voltage to function as a throttle, or a thrust lever; and/or the plurality of surface cavities comprise at least first and second sets of surface cavities, the surface cavities in the first set of surface cavities having a diameter and/or depth that is different from a diameter and/or depth of the surface cavities in the second set of surface cavities to form Taylor cones at different onset voltages, thereby allowing the applied voltage to function as a throttle, or a thrust lever.

In some embodiments of the first example embodiments of the electrospray thruster, the one or more channels are a plurality of channels arranged in an array, each of the channels being formed as a microcapillary with a length-to-width ratio of at least 100:1, a length of the channels is at least 100 µm, the extraction electrode comprises an extraction grid, the dielectric comprises, for each of the plurality of channels, a surface cavity that is formed as a recess extending into the dielectric from the downstream surface, each surface cavity being coaxial with one of the plurality of channels to form a channel-surface cavity pair, and the extraction grid comprises openings that are arranged such that each opening is positioned coaxial with a corresponding channel-surface cavity pair, each of the openings of the extraction grid have a diameter that is the same as, or greater than, a diameter of the corresponding surface cavity at the downstream surface of the dielectric, and the extraction grid is spaced apart from the downstream surface of the dielectric by a finite distance.

In some embodiments of the first example embodiments of the electrospray thruster, the one or more channels are a plurality of channels arranged in an array, each of the channels being formed as a microcapillary with a length-to-width ratio of at least 100:1, a length of the channels is at least 100 µm, the extraction electrode comprises an extraction grid, the dielectric comprises, for each of the plurality of channels, a surface cavity that is formed as a recess extending into the dielectric from the downstream surface, each surface cavity being coaxial with one of the plurality of channels to form a channel-surface cavity pair, and the extraction grid comprises openings that are arranged such that each opening is positioned coaxial with a corresponding channel-surface cavity pair, each of the openings of the extraction grid have a diameter that is the same as, or greater than, a diameter of the corresponding surface cavity at the downstream surface of the dielectric, the extraction grid is spaced apart from the downstream surface of the dielectric by a finite distance, and one or more of the channels is offset from the corresponding surface cavity to produce thrust at a vector angle with components both parallel and normal to the surface of the dielectric.

In some embodiments of the first example embodiments of the electrospray thruster, the one or more channels are a plurality of channels arranged in an array, each of the channels being formed as a microcapillary with a length-to-width ratio of at least 100:1, a length of the channels is at least 100 µm, the extraction electrode comprises an extraction grid, the dielectric comprises, for each of the plurality of channels, a surface cavity that is formed as a recess extending into the dielectric from the downstream surface, each surface cavity being coaxial with one of the plurality of channels to form a channel-surface cavity pair, and the extraction grid comprises openings that are arranged such that each opening is positioned coaxial with a corresponding channel-surface cavity pair, each of the openings of the extraction grid have a diameter that is the same as, or greater than, a diameter of the corresponding surface cavity at the downstream surface of the dielectric, the extraction grid is spaced apart from the downstream surface of the dielectric by a finite distance, one or more of the channels is offset from the corresponding surface cavity to produce thrust at a vector angle with components both parallel and normal to the surface of the dielectric, and the plurality of channels comprise at least first and second set of channels, the channels in the first set of channels having a diameter that is different from a diameter of the channels in the second set of channels to form Taylor cones at different onset voltages, thereby allowing an applied voltage to function as a throttle, or a thrust lever; and/or the plurality of surface cavities comprise at least first and second sets of surface cavities, the surface cavities in the first set of surface cavities having a diameter and/or depth that is different from a diameter and/or depth of the surface cavities in the second set of surface cavities to form Taylor cones at different onset voltages, thereby allowing the applied voltage to function as a throttle, or a thrust lever.

In some embodiments of the first example embodiments of the electrospray thruster, the one or more channels are a plurality of channels arranged in an array, each of the channels being formed as a microcapillary with a length-to-width ratio of at least 100:1, a length of the channels is at least 100 µm, the extraction electrode comprises an extraction grid, the dielectric comprises, for each of the plurality of channels, a surface cavity that is formed as a recess extending into the dielectric from the downstream surface, each surface cavity being coaxial with one of the plurality of channels to form a channel-surface cavity pair, and the extraction grid comprises openings that are arranged such that each opening is positioned coaxial with a corresponding channel-surface cavity pair, each of the openings of the extraction grid have a diameter that is the same as, or greater than, a diameter of the corresponding surface cavity at the downstream surface of the dielectric, for each channel, an extraction distance (d) is defined as a distance between the floor of the corresponding surface cavity and the extraction grid, each corresponding surface cavity has a diameter (m) that is greater than 2(d) to minimize an electrospray onset voltage and an applied voltage, and the extraction grid is spaced apart from the downstream surface of the dielectric by a finite distance.

In some embodiments of the first example embodiments of the electrospray thruster, the one or more channels are a plurality of channels arranged in an array, each of the channels being formed as a microcapillary with a length-to-width ratio of at least 100:1, a length of the channels is at least 100 µm, the extraction electrode comprises an extraction grid, the dielectric comprises, for each of the plurality of channels, a surface cavity that is formed as a recess extending into the dielectric from the downstream surface, each surface cavity being coaxial with one of the plurality of channels to form a channel-surface cavity pair, and the extraction grid comprises openings that are arranged such that each opening is positioned coaxial with a corresponding channel-surface cavity pair, each of the openings of the extraction grid have a diameter that is the same as, or greater than, a diameter of the corresponding surface cavity at the downstream surface of the dielectric, for each channel, an extraction distance (d) is defined as a distance between the floor of the corresponding surface cavity and the extraction grid, each corresponding surface cavity has a diameter (m) that is greater than 2(d) to minimize an electrospray onset voltage and an applied voltage, the extraction grid is spaced apart from the downstream surface of the dielectric by a finite distance, and one or more of the channels is offset from the corresponding surface cavity to produce thrust at a vector angle with components both parallel and normal to the surface of the dielectric.

In some embodiments of the first example embodiments of the electrospray thruster, the one or more channels are a plurality of channels arranged in an array, each of the channels being formed as a microcapillary with a length-to-width ratio of at least 100:1, a length of the channels is at least 100 µm, the extraction electrode comprises an extraction grid, the dielectric comprises, for each of the plurality of channels, a surface cavity that is formed as a recess extending into the dielectric from the downstream surface, each surface cavity being coaxial with one of the plurality of channels to form a channel-surface cavity pair, and the extraction grid comprises openings that are arranged such that each opening is positioned coaxial with a corresponding channel-surface cavity pair, each of the openings of the extraction grid have a diameter that is the same as, or greater than, a diameter of the corresponding surface cavity at the downstream surface of the dielectric, for each channel, an extraction distance (d) is defined as a distance between the floor of the corresponding surface cavity and the extraction grid, each corresponding surface cavity has a diameter (m) that is greater than 2(d) to minimize an electrospray onset voltage and an applied voltage, the extraction grid is spaced apart from the downstream surface of the dielectric by a finite distance, one or more of the channels is offset from the corresponding surface cavity to produce thrust at a vector angle with components both parallel and normal to the surface of the dielectric, and the plurality of channels comprise at least first and second set of channels, the channels in the first set of channels having a diameter that is different from a diameter of the channels in the second set of channels to form Taylor cones at different onset voltages, thereby allowing the applied voltage to function as a throttle, or a thrust lever; and/or the plurality of surface cavities comprise at least first and second sets of surface cavities, the surface cavities in the first set of surface cavities having a diameter and/or depth that is different from a diameter and/or depth of the surface cavities in the second set of surface cavities to form Taylor cones at different onset voltages, thereby allowing the applied voltage to function as a throttle, or a thrust lever.

In some embodiments of the first example embodiments of the electrospray thruster, the electrospray thruster comprises a monolithic construction.

According to a second example embodiment, an electrospray thruster is provided, the electrospray thruster comprising: at least one reservoir containing a fluid; at least first and second electrospray emitters, each comprising: a dielectric comprising one or more channels formed through a thickness of the dielectric; and an extraction electrode; the extraction electrode is positioned on an opposite side of the dielectric from the reservoir, in a direction of the thickness of the dielectric; a first end of each of the channels is in fluidic communication, at an upstream surface of the dielectric, with the fluid contained within the reservoir; and a second end of each of the channels is in fluidic communication, at a downstream surface of the dielectric, with an external atmosphere surrounding the thruster. The first and second electrospray emitters are arranged adjacent to each other on opposite sides of a plane and are inclined, relative to the plane perpendicular to a longitudinal direction, at opposite angles from each other. The first and second electrospray emitters are independently operable from each other. The thruster is configured such that, when the first electrospray emitter is activated by applying an electrospray onset voltage difference between the extraction electrode of the first electrospray emitter and the fluid, the fluid is ejected from the channels of the first electrospray emitter to generate a first thrust, which has a vector inclined relative to the plane at a same angle as the first electrospray emitter. The thruster is configured such that, when the second electrospray emitter is activated by applying the electrospray onset voltage difference between the extraction electrode of the second electrospray emitter and the fluid, the fluid is ejected from the channels of the second electrospray emitter to generate a second thrust, which has a vector inclined relative to the plane at a same angle as the second electrospray emitter.

In some embodiments of the second example embodiment of the electrospray thruster, the fluid comprises an ionic liquid (IL) propellant; when only the first electrospray emitter is activated, the electrospray thruster is configured to generate a net thrust that causes a rotational moment perpendicular to a first direction; when only the second electrospray emitter is activated, the electrospray thruster is configured to generate a net thrust that causes a rotational moment perpendicular to a second direction, which is opposite the first direction, relative to an axis of rotation; and when both the first and second electrospray emitters are activated, the electrospray thruster is configured to generate a net thrust that is substantially in the longitudinal direction with zero rotational moment.

According to a third example embodiment, an electrospray thruster is provided, the electrospray thruster comprising: at least one reservoir containing a fluid; at least first, second, third, and fourth electrospray emitters, each comprising: a dielectric comprising one or more channels formed through a thickness of the dielectric; and an extraction electrode; the extraction electrode is positioned on an opposite side of the dielectric from the reservoir, in a direction of the thickness of the dielectric; a first end of each of the channels is in fluidic communication, at an upstream surface of the dielectric, with the fluid contained within the reservoir; and a second end of each of the channels is in fluidic communication, at a downstream surface of the dielectric, with an external atmosphere surrounding the thruster. The first, second, third, and fourth electrospray emitters are substantially uniformly arranged about a longitudinal axis. The first and third electrospray emitters define a first electrospray emitter pair and are radially spaced apart from each other by about 180°, such that the first and third electrospray emitters are on opposite sides of the longitudinal axis from each other, and are inclined, relative to a plane that is perpendicular to the longitudinal axis, at opposite angles from each other. The second electrospray emitter is radially spaced apart from the first and third electrospray emitters by about 90°. The second and fourth electrospray emitters define a second electrospray emitter pair and are radially spaced apart from each other by about 180°, such that the second and fourth electrospray emitters are on opposite sides of the longitudinal axis from each other, and are inclined, relative to the plane that is perpendicular to the longitudinal axis, at opposite angles from each other. each of the first, second, third, and fourth electrospray emitters are independently operable from each other. The thruster is configured such that, when the first electrospray emitter is activated by applying an electrospray onset voltage difference between the extraction electrode of the first electrospray emitter and the fluid, the fluid is ejected from the channels of the first electrospray emitter to generate a first thrust, which has a vector inclined relative to the longitudinal axis at a same angle as the first electrospray emitter. The thruster is configured such that, when the second electrospray emitter is activated by applying the electrospray onset voltage difference between the extraction electrode of the second electrospray emitter and the fluid, the fluid is ejected from the channels of the second electrospray emitter to generate a second thrust, which has a vector inclined relative to the longitudinal axis at a same angle as the second electrospray emitter. The thruster is configured such that, when the third electrospray emitter is activated by applying the electrospray onset voltage difference between the extraction electrode of the third electrospray emitter and the fluid, the fluid is ejected from the channels of the third electrospray emitter to generate a third thrust, which has a vector inclined relative to the longitudinal axis at a same angle as the third electrospray emitter. The thruster is configured such that, when the fourth electrospray emitter is activated by applying the electrospray onset voltage difference between the extraction electrode of the fourth electrospray emitter and the fluid, the fluid is ejected from the channels of the fourth electrospray emitter to generate a fourth thrust, which has a vector inclined relative to the longitudinal axis at a same angle as the fourth electrospray emitter.

In some embodiments of the third example embodiment of the electrospray thruster, the fluid comprises an ionic liquid (IL) propellant; when only the first electrospray emitter is activated, the electrospray thruster is configured to generate a net thrust that causes a rotational moment perpendicular to a first direction; when only the second electrospray emitter is activated, the electrospray thruster is configured to generate a net thrust that causes a rotational moment perpendicular to a second direction, which is oriented at about 90° relative to the first direction, relative to the longitudinal axis; when only the third electrospray emitter is activated, the electrospray thruster is configured to generate a net thrust that causes a rotational moment perpendicular to a third direction, which is opposite the first direction, relative to the longitudinal axis; when only the fourth electrospray emitter is activated, the electrospray thruster is configured to generate a net thrust that causes a rotational moment perpendicular to a fourth direction, which is opposite the second direction, relative to the longitudinal axis; and when both the first and third electrospray emitters are activated and/or when both the second and fourth electrospray emitters are activated, the electrospray thruster is configured to generate a net thrust that is substantially in a longitudinal direction.

In some embodiments of the third example embodiment of the electrospray thruster, the fluid comprises an ionic liquid (IL) propellant; when only the first electrospray emitter is activated, the electrospray thruster is configured to generate a net thrust that causes a rotational moment perpendicular to a first direction; when only the second electrospray emitter is activated, the electrospray thruster is configured to generate a net thrust that causes a rotational moment perpendicular to a second direction, which is oriented at about 90° relative to the first direction, relative to the longitudinal axis; when only the third electrospray emitter is activated, the electrospray thruster is configured to generate a net thrust that causes a rotational moment perpendicular to a third direction, which is opposite the first direction, relative to the longitudinal axis; when only the fourth electrospray emitter is activated, the electrospray thruster is configured to generate a net thrust that causes a rotational moment perpendicular to a fourth direction, which is opposite the second direction, relative to the longitudinal axis; when both the first and third electrospray emitters are activated and/or when both the second and fourth electrospray emitters are activated, the electrospray thruster is configured to generate a net thrust that is substantially in a longitudinal direction; the first direction is a positive yaw direction, the second direction is a positive pitch direction, the third direction is a negative yaw direction, and the fourth direction is a negative pitch direction; and the electrospray thruster is configured to control yaw, pitch, and translator movements.

In some embodiments of the third example embodiment of the electrospray thruster, the electrospray onset voltage difference is less than 1,000 Volts (V); each of the channels for the first, second, third, and fourth electrospray emitters is formed as a microcapillary with a length-to-width ratio of at least 100:1; and the extraction electrode of each of the first, second, third, and fourth electrospray emitters is an extraction grid comprising a plurality of openings, each opening being substantially coaxial with one of the channels on a same electrospray emitter.

According to a fourth example embodiment, a spacecraft and/or satellite is provided, the spacecraft and/or satellite comprising at least one electrospray thruster comprising: at least one reservoir containing a fluid; at least first, second, third, and fourth electrospray emitters, each comprising: a dielectric comprising one or more channels formed through a thickness of the dielectric; and an extraction electrode; the extraction electrode is positioned on an opposite side of the dielectric from the reservoir, in a direction of the thickness of the dielectric; a first end of each of the channels is in fluidic communication, at an upstream surface of the dielectric, with the fluid contained within the reservoir; and a second end of each of the channels is in fluidic communication, at a downstream surface of the dielectric, with an external atmosphere surrounding the thruster. The first, second, third, and fourth electrospray emitters are substantially uniformly arranged about a longitudinal axis. The first and third electrospray emitters define a first electrospray emitter pair and are radially spaced apart from each other by about 180°, such that the first and third electrospray emitters are on opposite sides of the longitudinal axis from each other, and are inclined, relative to a plane that is perpendicular to the longitudinal axis, at opposite angles from each other. The second electrospray emitter is radially spaced apart from the first and third electrospray emitters by about 90°. The second and fourth electrospray emitters define a second electrospray emitter pair and are radially spaced apart from each other by about 180°, such that the second and fourth electrospray emitters are on opposite sides of the longitudinal axis from each other, and are inclined, relative to the plane that is perpendicular to the longitudinal axis, at opposite angles from each other. each of the first, second, third, and fourth electrospray emitters are independently operable from each other. The thruster is configured such that, when the first electrospray emitter is activated by applying an electrospray onset voltage difference between the extraction electrode of the first electrospray emitter and the fluid, the fluid is ejected from the channels of the first electrospray emitter to generate a first thrust, which has a vector inclined relative to the longitudinal axis at a same angle as the first electrospray emitter. The thruster is configured such that, when the second electrospray emitter is activated by applying the electrospray onset voltage difference between the extraction electrode of the second electrospray emitter and the fluid, the fluid is ejected from the channels of the second electrospray emitter to generate a second thrust, which has a vector inclined relative to the longitudinal axis at a same angle as the second electrospray emitter. The thruster is configured such that, when the third electrospray emitter is activated by applying the electrospray onset voltage difference between the extraction electrode of the third electrospray emitter and the fluid, the fluid is ejected from the channels of the third electrospray emitter to generate a third thrust, which has a vector inclined relative to the longitudinal axis at a same angle as the third electrospray emitter. The thruster is configured such that, when the fourth electrospray emitter is activated by applying the electrospray onset voltage difference between the extraction electrode of the fourth electrospray emitter and the fluid, the fluid is ejected from the channels of the fourth electrospray emitter to generate a fourth thrust, which has a vector inclined relative to the longitudinal axis at a same angle as the fourth electrospray emitter. The at least one electrospray thruster is rigidly attached to an outer surface of the spacecraft and/or satellite. The first, second, third, and fourth electrospray emitters have a monolithic construction and either (1) the at least one electrospray thruster is in a form of a recess extending inwardly from the outer surface of the spacecraft and/or satellite; or (2) the at least one electrospray thruster is in a form of a protrusion extending outwardly from the outer surface of the spacecraft and/or satellite.

According to a fifth example embodiment, a spacecraft and/or satellite is provided, the spacecraft and/or satellite comprising at least one electrospray thruster comprising: a reservoir containing a fluid; an electrospray emitter comprising: a dielectric comprising one or more channels formed through a thickness of the dielectric, and an extraction electrode, wherein the extraction electrode is positioned on an opposite side of the dielectric from the reservoir, in a direction of the thickness of the dielectric. A first end of each of the one or more channels is in fluidic communication, at an upstream surface of the dielectric, with the fluid contained within the reservoir. A second end of each of the one or more channels is in fluidic communication, at a downstream surface of the dielectric, with an external atmosphere surrounding the thruster. The thruster is configured such that, when an electrospray onset voltage difference is applied between the extraction electrode and the fluid, mass from the fluid is ejected from the one or more channels to generate thrust. The at least one electrospray thruster is rigidly attached to an outer surface of the spacecraft and/or satellite. The at least one electrospray thruster has a monolithic construction.

DETAILED DESCRIPTION

The subject matter disclosed herein is particularly relevant to the development of robust and affordable miniaturized electrospray thrusters, which can hold substantially any necessary quantity (e.g., hundreds, thousands, or more) of electrospray emitters, for electric micro-propulsion applications. The reason for this is that the devices, systems, and methods provide robust, affordable, and scalable electric micro-propulsion within the tight size and/or packaging constraints of mass, volume, and electric power aboard cubesats and other micro- and nano-satellites. Cubesats are increasingly used as a low-cost deployment solution to develop, test, demonstrate, and explore new space technologies, and to realize numerous scientific, research, defense, and commercial functions. Cubesats are considered an important technology to carry out many future missions, including missions to Mars. However, the vast majority of the 1,700+ cubesats launched so far lack a propulsion system and, as such, are entirely incapable of performing basic maneuvers (e.g., rendezvous, orbit-keeping, and attitude control), which necessarily severely limits the type and duration of the missions they can perform. In addition, cubesats without propulsion systems become space junk at the end of their missions, remaining in orbit for many years until atmospheric drag causes deorbit. Cubesats equipped with a propulsion system can be deorbited much more rapidly at the end of a mission by generating thrust to slow orbital velocity.

Figure 1:
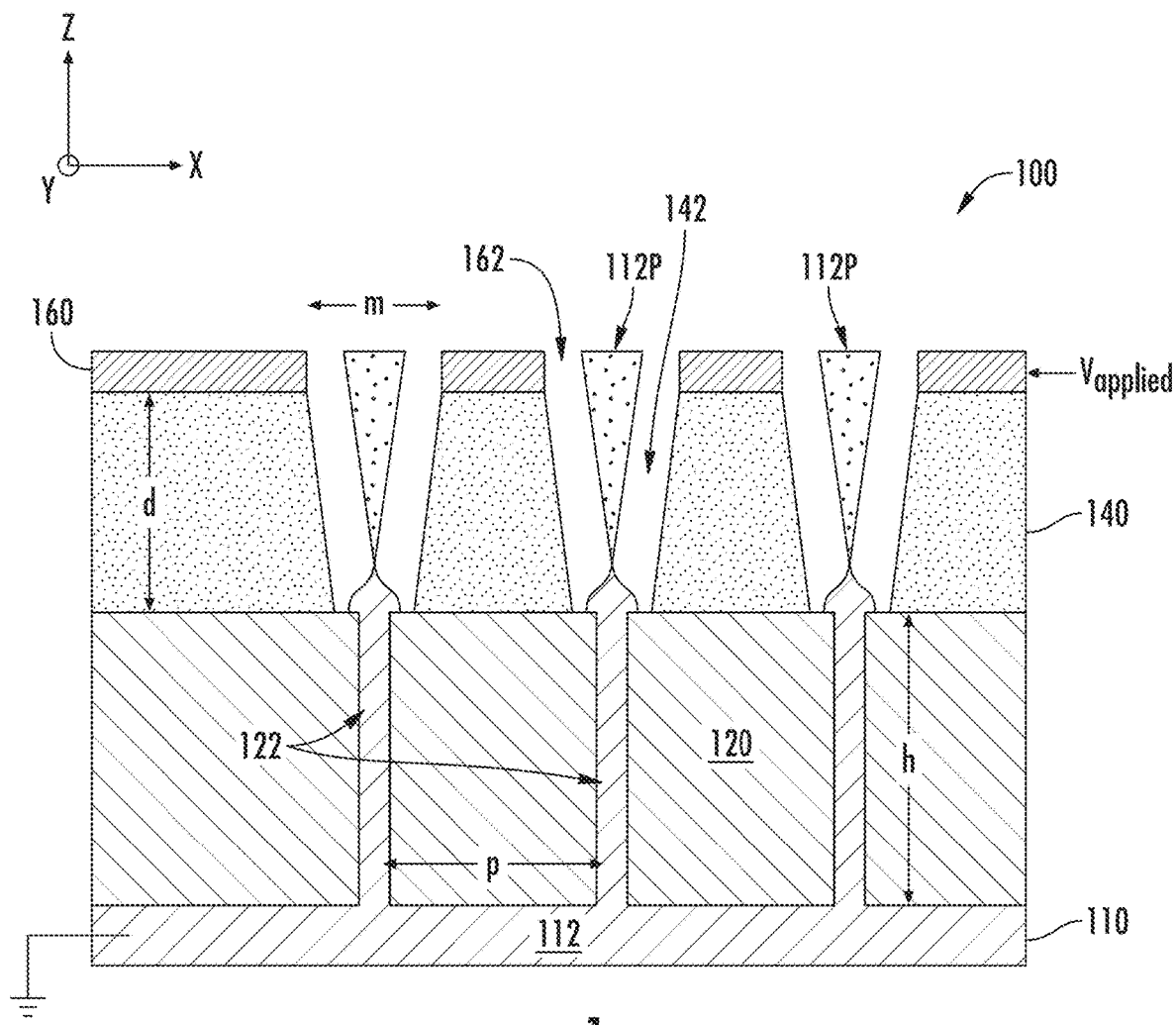
FIG. 1 is a schematic cross-sectional view of a first example embodiment of an electrospray thruster.

A novel electrospray thruster is disclosed herein. The thruster disclosed herein comprises internally fed microfluidic capillary emitters embedded inside a solid dielectric material. FIG. 1 shows a schematic illustration of a portion of an example embodiment of such an electrospray thruster, in which the microfluidic capillary emitters are used in place of the protruding micro-emitters commonly used in conventionally known electrospray thrusters. The electrospray thruster disclosed herein is implemented in the form of a low-thrust, high-specific impulse electric micro-propulsion technology, using electrospray concepts and ionic liquid propellants. Electrospray uses electrostatic forces to eject and spray an electrically conductive liquid to form an accelerated aerosol of electrically charged fine droplets, sometimes comprising ions. Ejecting the resulting stream of high-velocity ions/charged droplets from the emitter generates thrust. The electrospray thruster disclosed herein uses a unique electrospray emitter design, in which capillary emitters are embedded inside a solid dielectric, as shown in FIG. 1. When embedded in the solid dielectric, the resultant capillary members are more structurally robust than conventional electrospray-based thrusters that utilize a large quantity of delicate emitters protruding directly into the immediately surrounding ambient environment, which is known as a vacuum in space.

As shown in FIG. 1, the electrospray thruster has a reservoir 110, a solid (e.g., having a monolithic, or unitary, construction) dielectric 120 positioned over (e.g., in indirect or direct contact with) the reservoir 110, a dielectric spacer 140 positioned over (e.g., in indirect or direct contact with) the dielectric 120, and an extraction grid 160 positioned over (e.g., in indirect or direct contact with) the dielectric spacer 140. The extraction grid 160 can be referred to generally as an "electrode" elsewhere herein. In some embodiments, the reservoir 110, the dielectric 120, the dielectric spacer 140, and the extraction grid 160 have a monolithic, or unitary, construction.

The reservoir 110 contains an ionic liquid (IL) propellant 112. The dielectric 120 comprises a plurality of channels 122 (e.g., individual electrospray emitters) that are formed within (e.g., entirely within, so that no portion thereof protrudes from) the dielectric 120 and are formed through an entire thickness of the dielectric 120, in the direction between the reservoir 110 and the dielectric spacer 140. Thus, the channels 122 have a height that is the same as the thickness of the dielectric 120. The channels 122 are spaced apart from each other (e.g., in the x- and/or y-directions, relative to the x-direction, which is in the thickness direction of the dielectric 120. The channels 122 are each formed as a microfluidic capillary having a diameter (2r). The propellant 112 within the reservoir 110 is in fluidic communication with the plurality of channels 122, such that the propellant 112 can flow through an entire length of the channels 122, from the reservoir 110 to an outlet of the respective channel 122. Thus, the channels 122 are arranged in parallel with each other, such that a flow of the propellant 112 through any of the channels 122 is independent of all others of the channels 122.

In the example embodiment shown in FIG. 1, the dielectric spacer 140 comprises a plurality of cavities, or orifices 142. Each orifice 142 is substantially aligned with (e.g., so as to be coaxial to) one of the channels 122 and is formed through a thickness of (e.g., an entire thickness of) the dielectric spacer 140. The thickness of the dielectric spacer 140 is referred to herein as the extraction distance (d), which defines the distance between the downstream outlet of the channel 122 (e.g., where the Taylor cone forms) and the plane of the extraction electrode (e.g., the extraction grid 160). While the orifices 142 can have any suitable shape and/or cross-sectional profile, in the example embodiment shown in FIG. 1, the orifices 142 each have a generally tapering profile, with a diameter that increases proportionately to (e.g., with a constant slope) the distance from the outlet of the channel 122 that forms the respective electrospray emitter. Thus, in the example embodiment shown, the orifices 142 are generally p shaped. The extraction grid 160 comprises a plurality of holes 162 that are substantially aligned with (e.g., so as to be coaxial to) a corresponding one of the orifices 142. The holes 162 of the extraction grid 160 have a same or larger size (e.g., diameter) as the orifice 142 over which such hole 162 is positioned. The diameter of the holes 162 and/or of the orifices 142 define the grid opening. As shown, no portion of the thruster extends through and/or beyond, nor is positioned beyond (e.g., on an opposite side of the extraction grid 160 from the dielectric spacer 140) the extraction grid 160.

Ionic liquids (IL) are particularly advantageous for use as propellants for electrospray thrusters, since such ILs are liquid salts with melting temperatures below 100° C., meaning they substantially entirely comprise ions and exhibit high ionic conductivity. The presence of both cations and anions in an IL allows an electrospray thruster to be sequentially operated at opposite polarities, which prevents electrical charging of the spacecraft and eliminates the need for neutralizing electron beams using charge neutralizers. In addition, IL propellants are typically inert, stable, and can be stored in unpressurized reservoirs and used in the vacuum of space without evaporation losses, given their extremely low vapor pressures.

During operation, the propellant 112 flows into and along the lengths of the channels 122. A voltage differential is applied between the extraction grid 160 and the IL propellant 112 (e.g., via the reservoir 110). A reference voltage $V_0$ is applied to the propellant 112 and an activation voltage $V_{applied}$ is applied to the extraction grid 160, such that the voltage difference between the extraction grid 160 and the propellant 112 is defined as the difference between the activation voltage $V_{applied}$ and the reference voltage $V_0$. The propellant 112 forms a Taylor cone at the outlet of the channels 122, from which a jet, or stream, of electrically charged particles is emitted, through the corresponding orifice 142. The propellant 112 then forms a plume of electrosprayed propellant 112P that exits the orifice 142. By controlling where, along the extraction grid 160, the activation voltage $V_{applied}$ is applied, individual channels 122, or groups of channels 122, can be controlled independently, such that less than all of the channels 122 of a thruster 100 can be activated at a same time, thereby allowing for activation of a portion of the channels 122, or activation of groups of the channels 122 in a pattern.

Figure 2A:
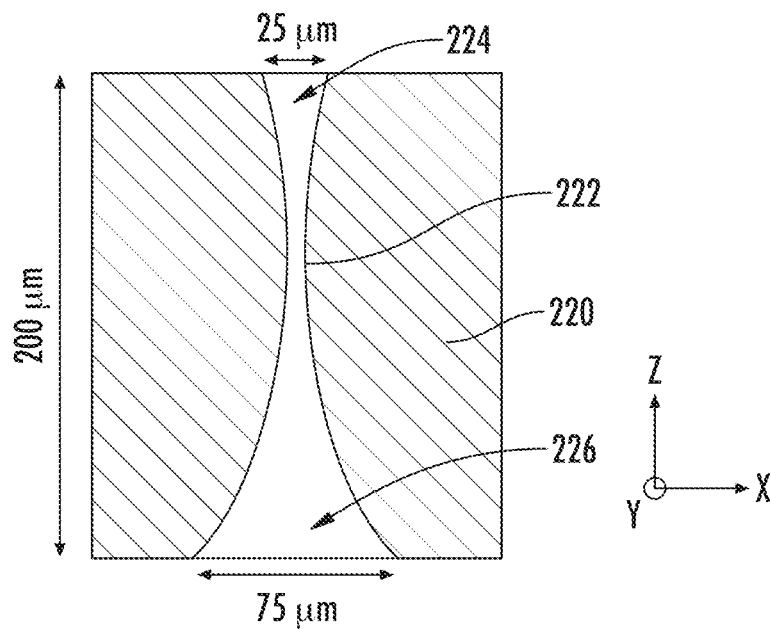
FIG. 2A is a schematic cross-sectional view of an example embodiment of a microcapillary, or channel, formed through the dielectric of an electrospray thruster.

It is possible, using the thruster 100 illustrated in FIG. 1, to generate the electric field strengths that are necessary to initiate the electrospray process. In an example embodiment, shown in FIGS. 2A and 2B, an emitter chip 220 was designed for use in an example embodiment of a thruster, generally designated 101. The emitter chip 220 was fabricated out of fused silica ($SiO_2$) that is about 200 µm thick. The emitter chip 220 comprises a quantity of 16 electrospray emitters 222, each of which is in the form of a microcapillary. The emitters 222 were micromachined using an ultrafast laser (20 W Tangerine; Amplitude Systèmes) with the following settings: 515 nm wavelength, 330 femtosecond pulse duration, 10 µJ per pulse, 100 kHz pulse repetition rate. The laser beam was focused into the fused silica emitter chip 220 using a 0.60 numerical aperture microscope objective (H32x/0.60∞/1.80; Leitz Wetzlar). As shown in FIG. 2A, each electrospray emitter 222 is in the form of a microcapillary with an asymmetric hourglass profile, with a "neck" width (e.g., the narrowest width) of about 5 µm. The height, or length, of each electrospray emitter 222 was about 200 µm, which is also the same as the thickness of the emitter chip 220 through which the electrospray emitters 222 are formed. The inlet 226 of each electrospray emitter 222 is positioned against (e.g., in direct contact with), and in fluidic communication with, a reservoir 210, which is in the form of a plastic cuvette in the example embodiment shown. The inlet 226 of each electrospray emitter 222 has a width of about 75 µm. The outlet 224 of each electrospray emitter 222 is positioned on an opposite side of the emitter chip 220 from the reservoir 210 and is substantially or entirely coplanar with the outermost surface of the emitter chip 220. The outlet 224 of each electrospray emitter 222 has a width of about 25 µm. The emitter chip 220 is attached to the reservoir 210 (e.g., in the form of a plastic spectroscopic cuvette, which was modified to act as a reservoir for an IL propellant 212) via a gasket 290. In this example embodiment, the gasket 290 has a generally annular shape and comprises polydimethylsiloxane (PDMS). The reservoir 210 (e.g., the cuvette) has a first port, or opening, through which the IL propellant 212 can be provided to all of the electrospray emitters 222 (e.g., in parallel) and is further configured to provide contact (e.g., via a second port) of the IL propellant 212 with an electrode for applying the reference voltage to the IL propellant 212 within the reservoir 210.

Figure 2B:
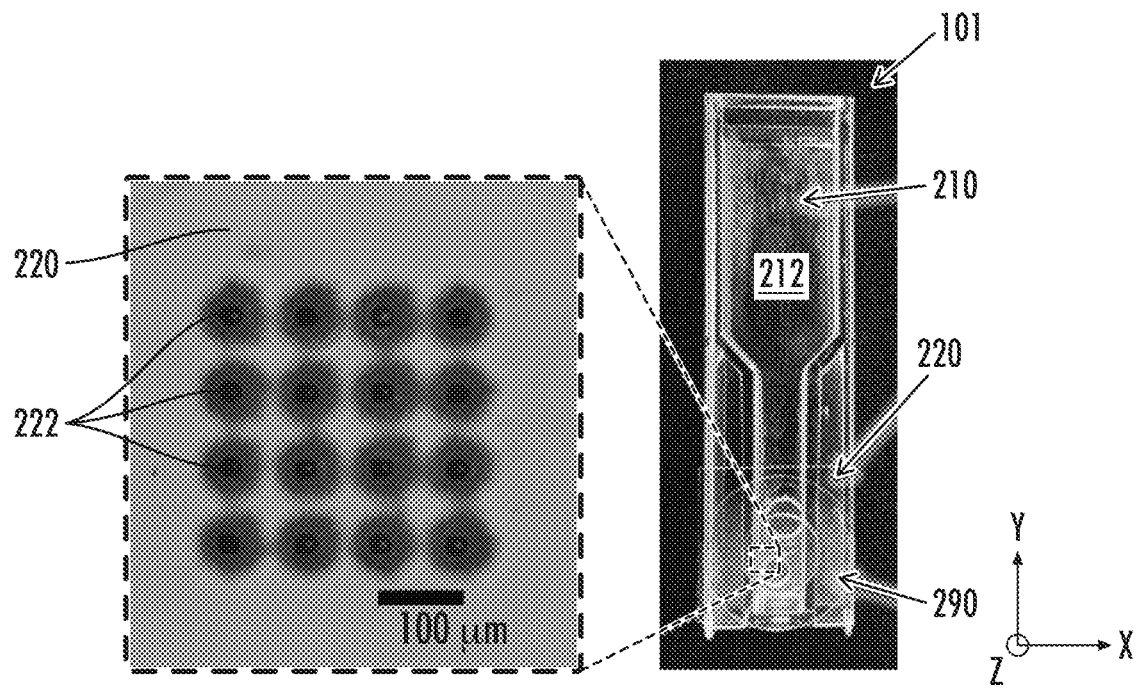
FIG. 2B shows aspects of an example prototype of an electrospray thruster.

In the example embodiment shown in FIGS. 2A and 2B, the thruster 101 was operated in an atmospheric vacuum condition and 1-ethyl-3-methylimidazolium bis(trifluoromethylsulfonyl)imide (EMI:TFSI) was used as the IL propellant 212 within the reservoir 210. Thus, in determining efficacy of this example embodiment of the thruster 101, the thruster 101 was positioned within a vacuum chamber. A titanium (Ti) screen was used as the extraction grid and was positioned on an opposite side of the emitter chip 220 from the reservoir 210. A sheet of copper (Cu) was used as a Faraday cup to collect ions for measurement of the emission of the IL propellant 212. Electrospray emission testing of the electrospray emitters 222 in the emitter chip 220 was verified at a vacuum of about $2 \times 10^{-6}$ torr. The extractor grid was positioned about 500 µm away from the surface of the emitter chip 220 on which the outlets 224 are formed. A differential electric potential (e.g., voltage difference) was applied between the reservoir 210 (e.g., via the electrode thereof that is in contact with the IL propellant 212 within the reservoir 210) and the extraction grid using a high-voltage power supply. The applied voltage was manually controlled. The current flowing between the Faraday cage and electric ground was measured using a picoammeter, which was connected to a PC via a general-purpose interface bus (GPIB). Data acquisition of the measured current flow was performed using a National Instruments Virtual Instrument.

Figure 3:
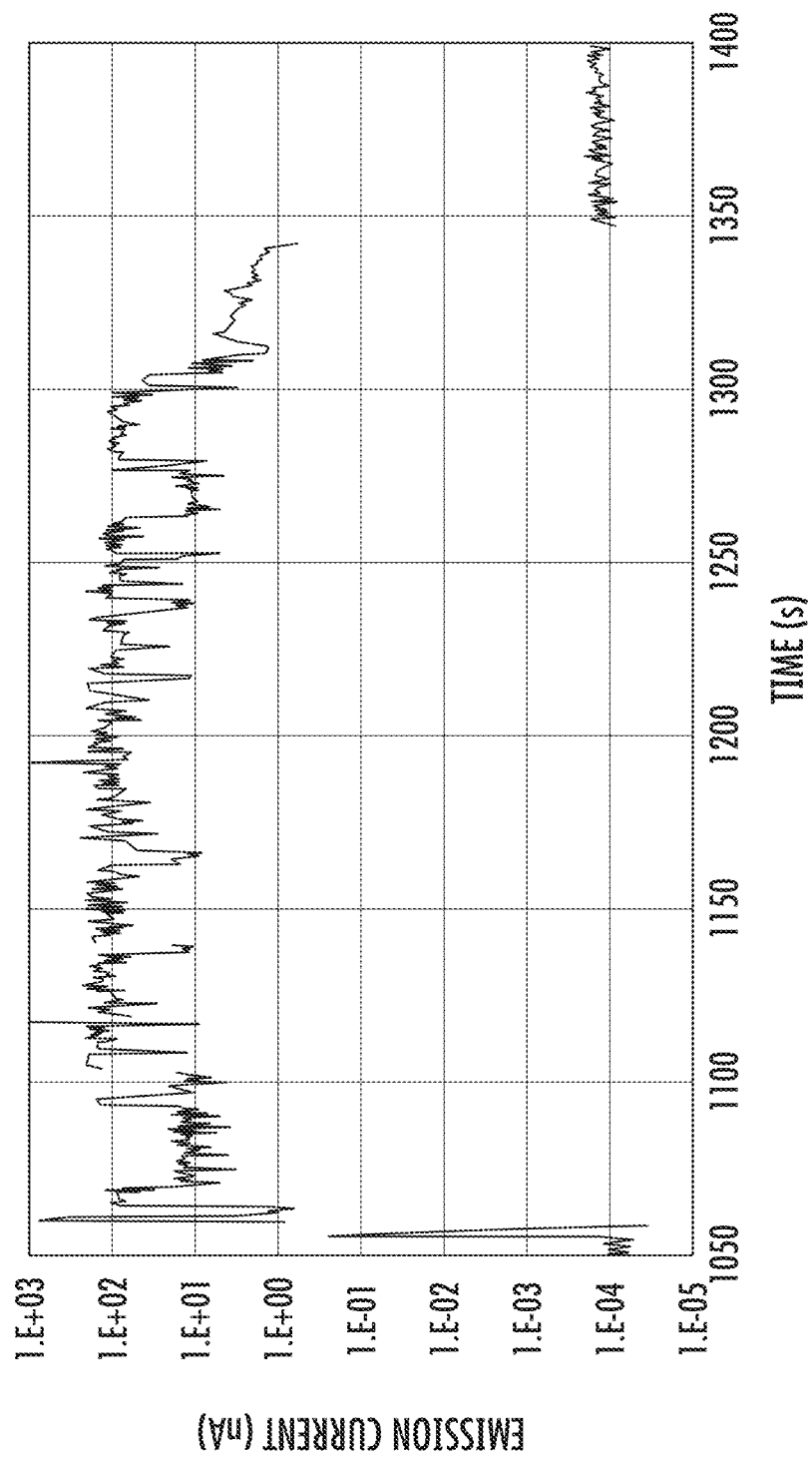
FIG. 3 is a graphical plot of emission current v. time for an electrospray thruster.

The measured electrospray emission current for the example embodiment of the thruster 101 shown in FIGS. 2A and 2B is shown in the graphical plot of FIG. 3. With a voltage differential of 0 V applied between the electrode within the reservoir 210 and the extraction grid, the electrospray emission current passing through the picoammeter was on the order of about 0.1 pA. With an applied voltage of about 2,400 V, an electrospray emission current of about 10 nA was measured. With an applied voltage of about 2,900 V, an electrospray emission current of about 100 nA was measured. The thruster 101 was able to operate for more than 200 seconds without interruption. This operation time is merely an example and in no way limits the duration of operating times that can be achieved by such electrospray thrusters as are disclosed herein. Subsequent optical inspection of the emitter chip 220 revealed a minor deposit on the surface of the emitter chip 220, but which otherwise remained intact and was not damaged during use. Such electrospray-based thrusters as are disclosed herein, having internally-fed electrospray emitters 222 in the form of microfluidic capillaries embedded inside a solid dielectric (e.g., emitter chip 220), is a far more robust design than conventionally known electrospray-based thrusters, which have comparatively significantly more delicate micro-emitters protruding directly into (e.g., so as to be exposed directly to) an atmospheric vacuum condition.

The example electrospray emission currents noted herein clearly demonstrate efficacy of the thruster 101 in producing ion emission via electrospray. By increasing the quantity of electrospray emitters 222 from the quantity of 16 in the example embodiment shown in FIG. 2B to a quantity of 1600 electrospray emitters 222 that are otherwise identical to those shown and described with respect to FIGS. 2A and 2B, an electrospray emission current of at least about 10 µA can be produced. While the onset, or activation, voltage differential of about 2,400 V is large compared to some currently known electrospray systems, which report activation voltage differentials of 470 V and 750 V. However, the large extraction distance (about 500 µm) between the surface of the emitter chip 220 and the extraction grid is at least partially responsible for the comparatively greater electrospray onset voltages described herein. The electrospray thruster 101 could, for example, be modified by decreasing the extraction length; increasing the height, or length, of the electrospray emitters 222; and/or decreasing the width of the electrospray emitters 222. In particular, it is possible when forming the emitter chip 220 from $SiO_2$ to achieve electrospray onset voltages below 500 V by positioning the extraction grid about 100 µm away from the surface of the emitter chip and forming the electrospray emitters 222 within an emitter chip 220 having a thickness of about 500 µm, such that the electrospray emitters have a height, or length, of about 500 µm, and forming the electrospray emitters 222 to have a constant diameter of about 1 µm. Such high aspect ratio, defined as height-to-diameter, electrospray emitter patterns can be formed using ultrafast-laser micromachining devices and techniques, but cannot be produced using conventional, or standard, lithography techniques and/or other direct-write methods, which are frequently used to fabricate protruding electrospray emitters for use in conventional thrusters for electric micro-propulsion applications. As such, it is particularly advantageous for such electrospray emitters as are disclosed herein to be manufactured using ultrafast-laser micromachining devices and techniques.

A method of designing such channels 122 (e.g., electrospray emitters) is provided herein, using electrostatic computational modelling to identify clear guidelines for basic hardware design of channels 122 with sub-kilovolt electrospray onset voltages. The computational model considers emitter arrangement, height (h), spacing (p), tip radius (r), distance to extraction grid (d), diameter (m) of the openings 162 in the extraction grid 160, the electrical permittivity of the thruster materials, and surface tension of the IL propellant 112, in accordance with the schematic illustration shown in FIG. 1. Thus, using this method, the electrospray onset voltage can be determined as a function of these parameters. Using such a method, it has been determined that electric shielding effects, caused by the proximity of both the base of the channels 122 and of adjacent channels 122, increases the electrospray onset voltage. These shielding effects, however, have been determined to become negligible for channels 122 with heights, or lengths, greater than about 400 µm and with spacing between channels 122 that is at least about 150% greater than the height of the channels 122. It has also been shown that the required electrospray onset voltage scales with (e.g., is proportionate to) the relative electric permittivity of the materials from which the electrospray thruster 100 is made, including the dielectric 120 and the dielectric spacer 140. It has further been demonstrated that electrospray thrusters 100 as disclosed herein, which have a plurality of channels 122 in the form of microcapillaries) embedded entirely within a solid (e.g., single piece) dielectric 120, can be operable to have a sub-kilovolt (i.e., less than 1,000 V) electrospray onset voltage, so as to be operable with substantially identical power supplies as are used in currently known electrospray thrusters. In an advantageous example embodiment, such an electrospray thruster 100 can have an electrospray onset voltage of about 500 V or less when the channels 122 formed within the dielectric 120 have a height of about 500 µm and a diameter of about 2 µm or less. In order to provide enhanced retrofit applications for the electrospray thrusters disclosed herein, it is advantageous for such electrospray thrusters to be operable (e.g., to have an electrospray onset voltage) using a power supply configured to provide up to an including 1,000 V and, particularly advantageously, less than 500 V. For instances requiring higher mass flow rates, applied voltages in excess of 1,000 V may be desirable. In another advantageous example embodiment, such an electrospray thruster 100 can have an electrospray onset voltage of about 200 V or less when the distance to the extraction grid (d) is about 10 µm or less and the diameter of openings 162 in extraction grid 160 (m) is about 10 µm or less.

The channels 122 can be prepared using a dielectric 120 comprising, consisting essentially of, or consisting of fused silica, borosilicate glass, aluminosilicate glass, or any other dielectric material with low dielectric constant and high dielectric strength, that is wetted by the IL propellant 112, and is chemically compatible with the IL propellant 112. In some embodiments, the internal diameter of the channels 122 is 10 µm or less. In some embodiments, the height of the channels 122 is in the range of about 100 µm to about 1000 µm. In some embodiments, spacing between channels 122 ranges between 0.5 and 3 times the emitter height. For a cubesat, in some embodiments, the number of channels 122 in a single 2D thruster array, covering an area of 10 cm×10 cm, will range between 100 and 251,001, or higher. In some embodiments, the extraction distance is in the range of about 10 µm to about 100 µm. In some embodiments, the opening of the extraction grid 160 is approximately equal to 2× the extraction distance (d), which is the distance between the downstream outlet of the channel 122 (e.g., where the Taylor cone forms) and the plane of the extraction electrode (e.g., the extraction grid 160), measured in a direction perpendicular to the direction and/or plane of extension of the dielectric 120 and/or the extraction grid 160; such an arrangement can advantageously maximize the vertical component of the electric field at the tip of the IL propellant-filled channels 122. This relationship can be expressed according to the equation m=2(d).

Figure 10:
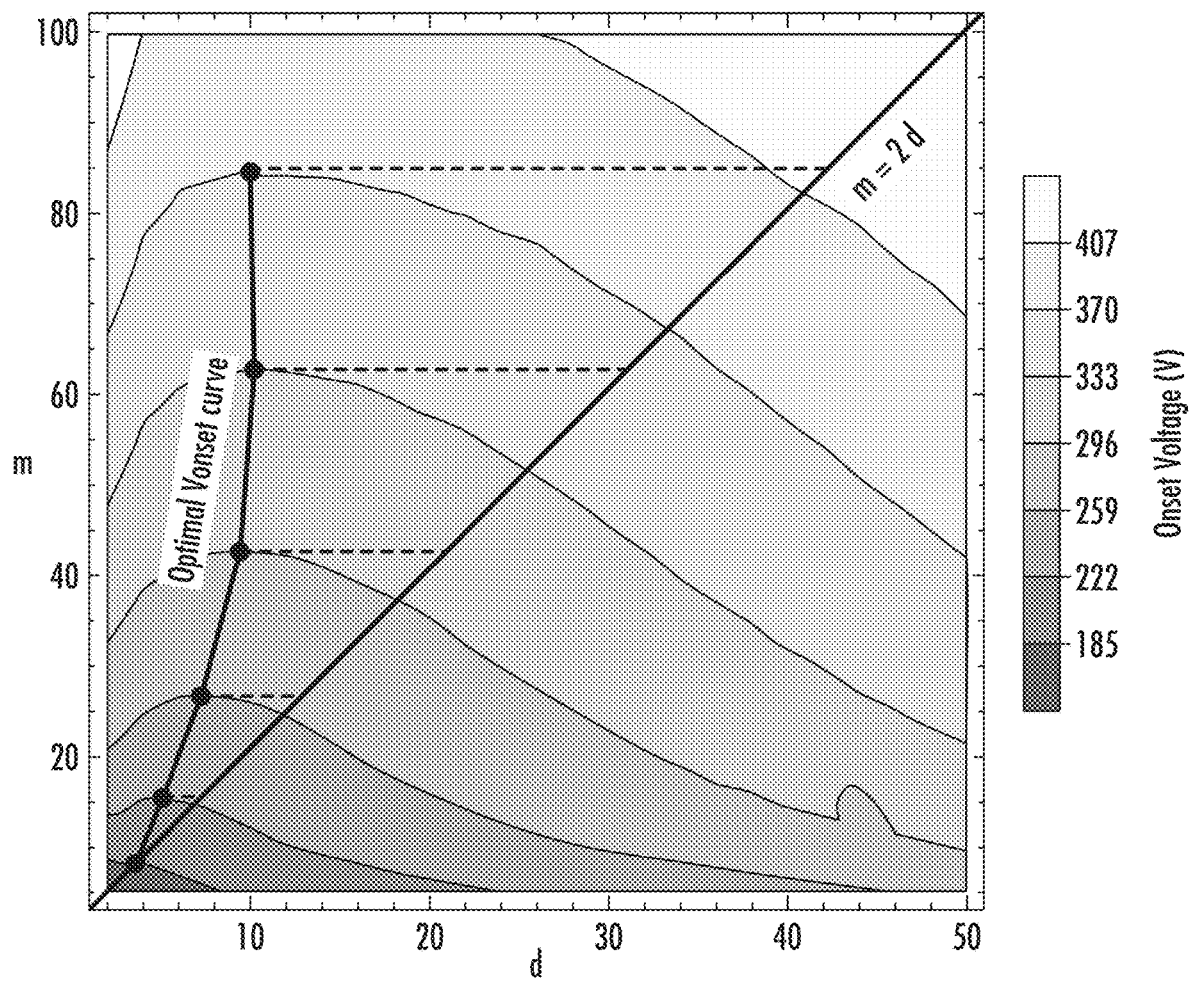
FIG. 10 is a graphical plot of electrospray onset voltage values as a function of the diameter, or width, of the openings in the electrospray grid and the extraction distance for the fourth example embodiment shown in FIG. 6.

In some embodiments, such as, for example, for "on-chip" electrospray thruster embodiments disclosed elsewhere herein (see, e.g., FIGS. 6-8B), for which the equation m=2(d) does not result in optimal electrospray onset voltages, the extraction distance (d) that minimizes the electrospray onset voltage for a certain opening formed in the extraction grid 160 may be selected using results generated via electrostatic computational modeling. Stated somewhat differently, In some embodiments, when the m=2(d) rule of thumb is not applicable, the extraction distance (d) that minimizes the electrospray onset voltage for a certain opening of the extraction grid 160 is chosen using the results of electrostatic computational modelling. FIG. 10 is a graphical plot that demonstrates how, for such "on-chip" embodiments, the results can be improved drastically over the m=2(d) equation. In generating the graphical plot shown in FIG. 10, the computational software ANSYS® Electronics was utilized, along with the electrostatic solver in the Maxwell tool kit, such that a finite element method is used in solving for field variables. The computational software described herein is merely exemplary and other suitable software may be used without diverging from the scope of the presently disclosed subject matter.

Such thrusters 100 can be fabricated, for example, using ultrafast-laser micromachining techniques, such that each thruster comprises a single 2D array of microcapillary-type channels 122. During validation of the subject matter disclosed herein, several prototype thrusters were produced and successfully tested under vacuum for several IL propellants 112. Electrospray currents produced by such prototype thrusters 100 were collected by a Faraday cup and measured, thus validating the proposed electrospray emitter design. Based on the measured currents during validation of the design of these thrusters 100, an appreciable thrust on the order of a few tens of micronewtons (µN) was determined to be within the performance capabilities of such thrusters 100. Also, it was determined that such thrusters 100 are expected to have a specific impulse on the order of about 5000 seconds.

Figure 4:
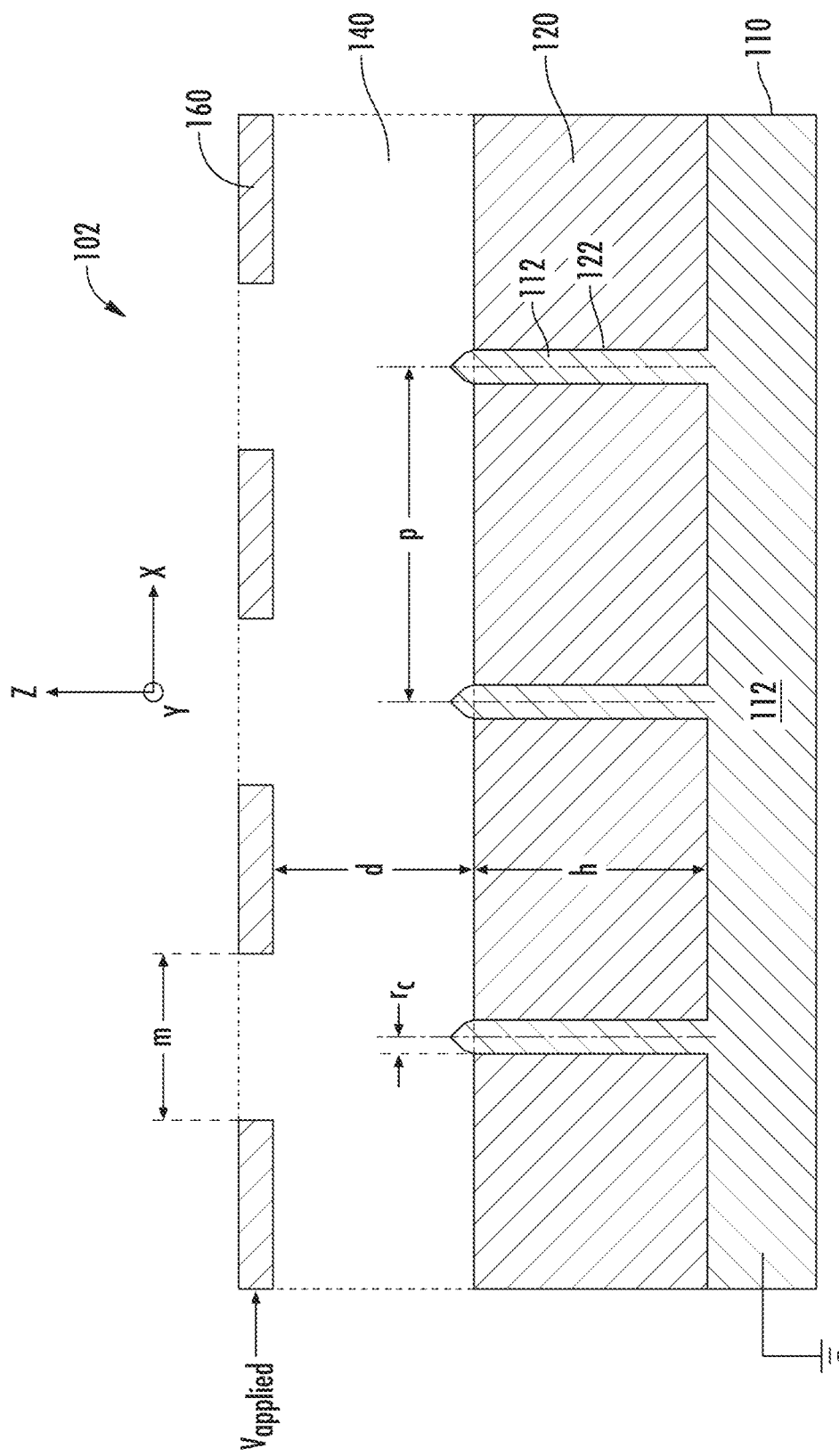
FIG. 4 is a schematic cross-sectional view of a second example embodiment of an electrospray thruster.

FIG. 4 is a schematic illustration of an example electrospray thruster, generally designated 102, according to another embodiment. According to this example embodiment, the thruster 102 comprises a reservoir 110 containing an IL propellant 112, a dielectric 120 in fluidic communication with the reservoir 110, and an extraction grid 160, which is spaced apart from the outer surface of the dielectric 120 by an extraction distance (d). Unlike in the thruster 100, however, the extraction grid 160 is spaced apart from the dielectric 120 by a void 140 (e.g., an empty space) in which a vacuum is present. Thus, the thruster 102 does not comprise a discrete dielectric spacer, as is illustrated in the thruster 100. In some embodiments, the reservoir 110 and the dielectric 120 have a monolithic, or unitary, construction. In some embodiments, the dielectric 120 and the extraction grid 160 have a monolithic, or unitary, construction. In some embodiments, the reservoir 110, the dielectric 120, and the extraction grid 160 have a monolithic, or unitary, construction. In the thruster 102, the dielectric 120 comprises a plurality of channels 122 (e.g., in the form of a plurality of electrospray emitters) that are formed entirely through a thickness of the dielectric 120 and have a length, or height, of about 100 µm to about 1000 µm and have a width of about 0.1 µm to about 10 µm and are capable of wicking a liquid via capillary action. A plurality of these channels are arranged in an array that is a regular, periodic, random, or non-random arrangement. Thus, each of the channels 122 has a first end that is in fluidic communication with, and receives the IL propellant 112 from, the reservoir 110, and a second end that is in fluidic communication with, and outputs the IL propellant 112 into, the void 140. The extractor grid 160 is on an opposite side of the dielectric 120 from the reservoir 110. As the IL propellant 112 is drawn into the channels 122 (e.g., due to applied pressure and/or capillary action), the channels 122 act in a manner that is similar to the needle of a conventional electrospray device. A suitable reference voltage is applied to the propellant 112 and an activation voltage $V_{applied}$ is applied to the extraction grid 160. Thus, an electric potential difference (e.g., voltage differential) is present between the IL propellant 112 and the extraction grid 160.

Figure 5:
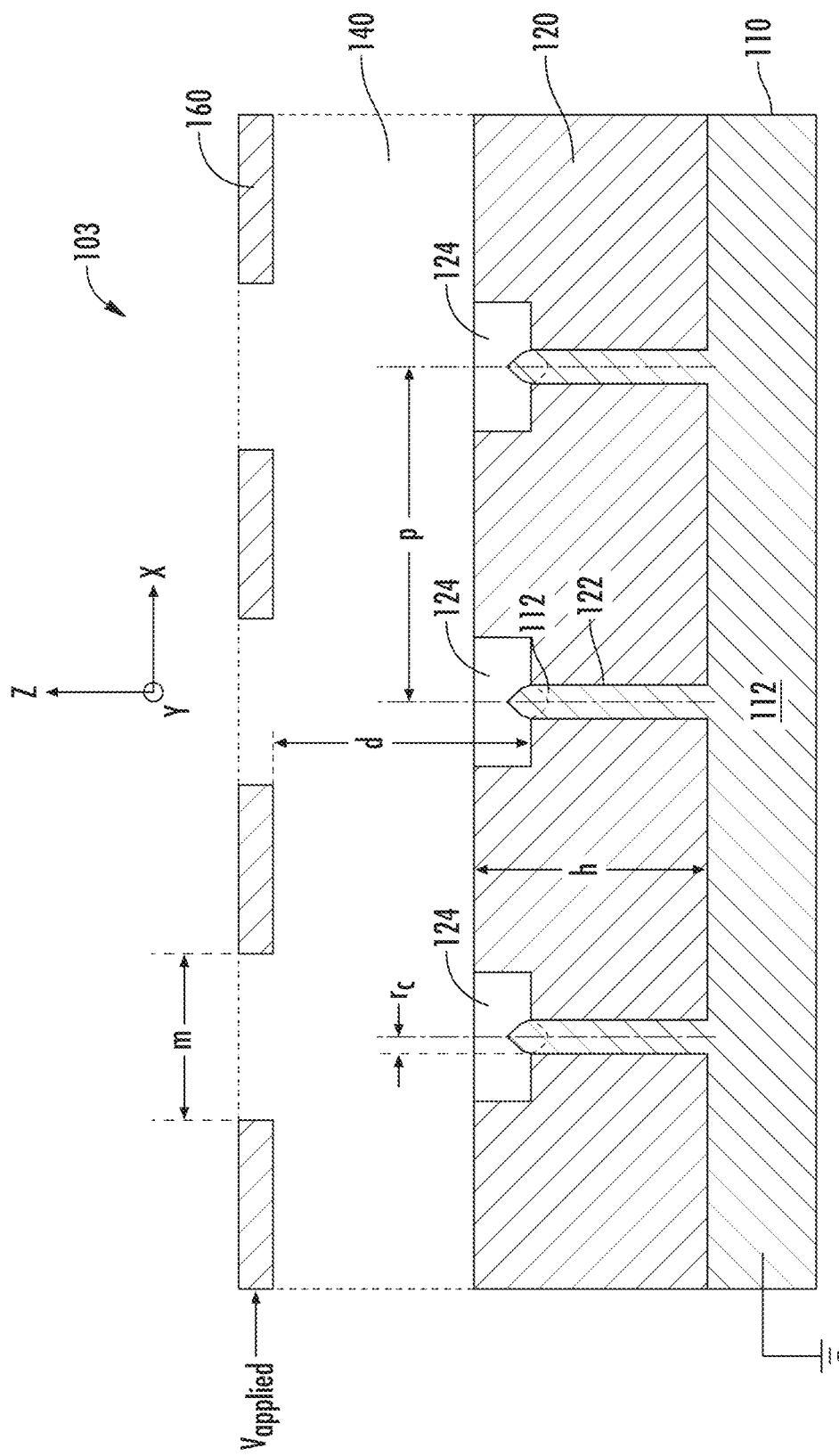
FIG. 5 is a schematic cross-sectional view of a third example embodiment of an electrospray thruster.

FIG. 5 is a schematic illustration of another example embodiment of a thruster, generally designated 103, which comprises a reservoir 110 containing an IL propellant 112, a dielectric 120 in fluidic communication with the reservoir 110, and an extraction grid 160, which is spaced apart from the floor of the surface cavity 124 by an extraction distance (d). As used herein, "downstream surface" is the surface of the dielectric 120 on which the Taylor cone is shown being formed. Thus, according to this embodiment, the thruster 103 is formed as a microfluidic chip, which can be produced via direct-write ultrafast laser micromachining and/or additive manufacturing techniques. In some embodiments, the dielectric 120 and the extraction grid 160 have a monolithic, or unitary, construction. In some embodiments, the reservoir 110, the dielectric 120, and the extraction grid 160 have a monolithic, or unitary, construction. Such dielectric 120 has one or more channels 122 formed therein in the form of one or more (e.g., a plurality of) microcapillaries and one or more surface cavities 124. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. A plurality of these channel-surface cavity pairs are arranged in an array that is a regular, periodic, random, or non-random arrangement. As the IL propellant 112 is drawn into the channels 122 (e.g., due to applied pressure and/or capillary action), the channels 122 act in a manner that is similar to the needle of a conventional electrospray device. A suitable reference voltage is applied to the propellant 112 and an activation voltage $V_{applied}$ is applied to the extraction grid 160. Thus, an electric potential difference (e.g., voltage differential) is present between the IL propellant 112 and the extraction grid 160.

Figure 6:
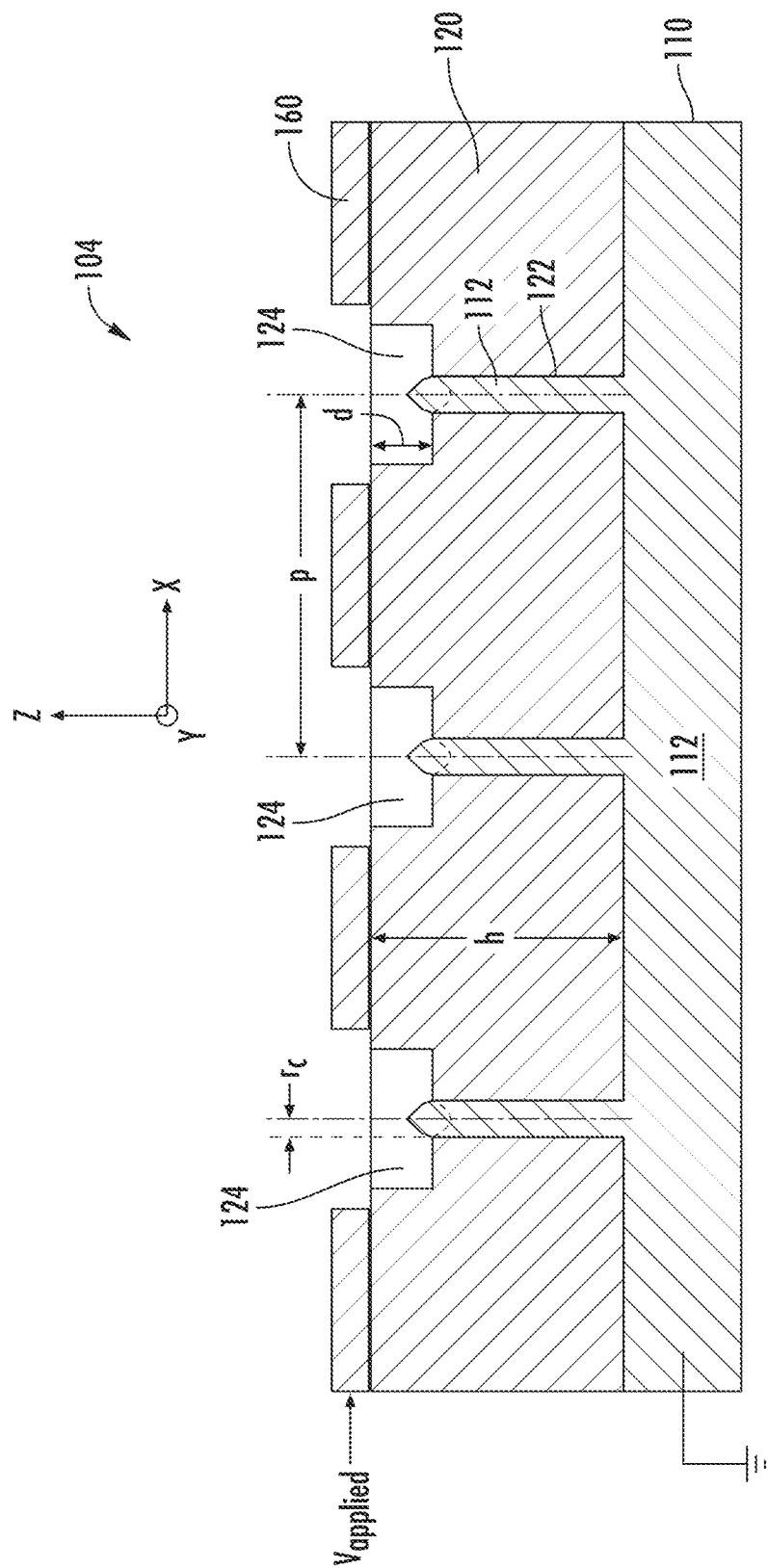
FIG. 6 is a schematic cross-sectional view of a fourth example embodiment of an electrospray thruster.
Figure 7:
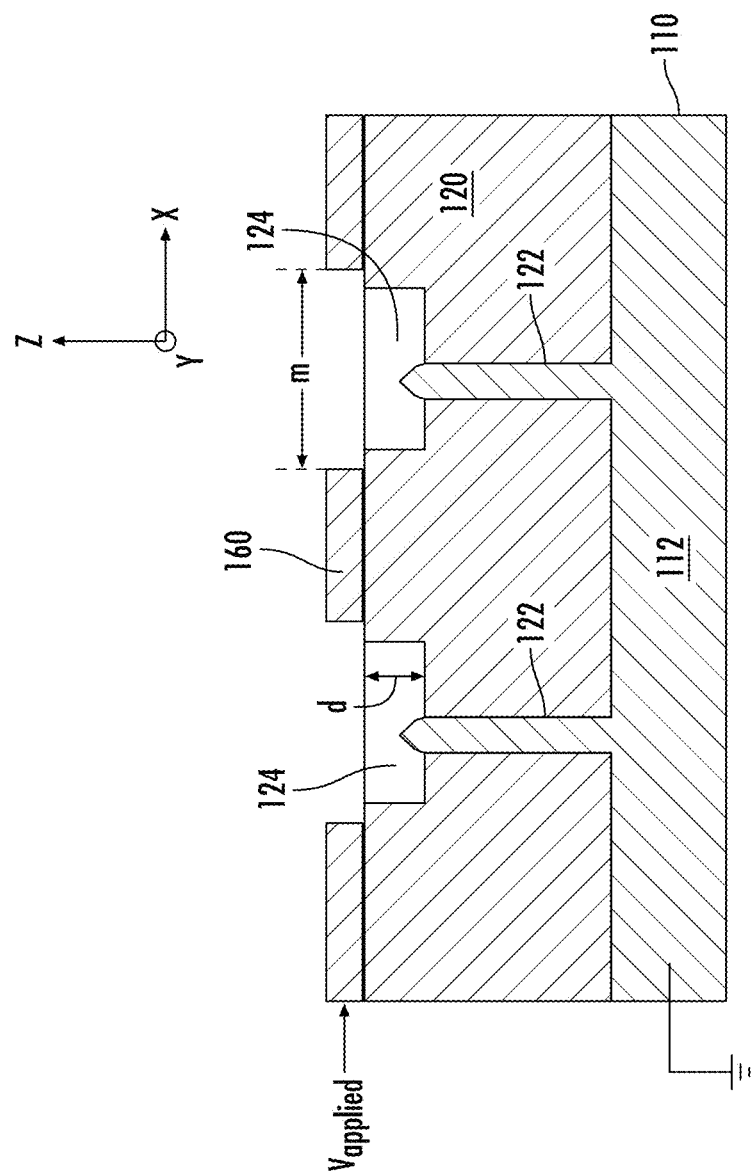
FIG. 7 is a schematic cross-sectional view of a fifth example embodiment of an electrospray thruster.

FIG. 6 is a schematic illustration of another example embodiment of a thruster, generally designated 104, which comprises a reservoir 110 containing an IL propellant 112, a dielectric 120 in fluidic communication with the reservoir 110, and an extraction grid 160, which is directly adjacent to (e.g., in direct contact with) the downstream surface of the dielectric 120. As used herein, "downstream surface" is the surface of the dielectric 120 on which the Taylor cone is shown being formed. Thus, according to this embodiment, the thruster 104 is formed as a microfluidic chip, which can be produced via direct-write ultrafast laser micromachining and/or additive manufacturing techniques. As shown, the dielectric 120 and the extraction grid 160 have a monolithic, or unitary, construction. In some embodiments, the reservoir 110, the dielectric 120, and the extraction grid 160 have a monolithic, or unitary, construction. Such dielectric 120 has one or more channels 122 formed therein in the form of one or more (e.g., a plurality of) microcapillaries and one or more surface cavities 124. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. A plurality of these channel-surface cavity pairs are arranged in an array that is a regular, periodic, random, or non-random arrangement. The downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120, excluding the surfaces of the surface cavities 124. Thus, the extraction distance (d) between the extraction grid 160 and the downstream surface of the dielectric 120, on which the Taylor cone is formed, is defined by the depth of the cavity 124. As the IL propellant 112 is drawn into the channels 122 (e.g., due to applied pressure and/or capillary action), the channels 122 act in a manner that is similar to the needle of a conventional electrospray device. A suitable reference voltage is applied to the propellant 112 and an activation voltage $V_{applied}$ is applied to the extraction grid 160. Thus, an electric potential difference (e.g., voltage differential) is present between the IL propellant 112 and the extraction grid 160.

In some embodiments, a thruster (e.g., 100, 102, 103, 104) is provided in the form of a microfluidic chip comprising a dielectric 120, which is solid and has one or more (e.g., a plurality of) channels 122 formed therein in the form of one or more (e.g., a plurality of) microcapillaries. The channels 122 are open on the opposing first and second longitudinal ends thereof and have a length, or height, of about 100 µm to about 1000 µm and have a width of about 0.1 µm to about 10 µm. A plurality of such channels 122 is provided, in some embodiments, in the form of an array, which can be formed according to (e.g., organized in) a regular, periodic, random, or non-random arrangement, which can be in the shape of a circle, or square, or triangle, or any other suitable 2D geometric figure. The channels 122 are advantageously formed inside the dielectric 120 by one or more of ablation of the dielectric material, axial compression of the dielectric material, laser etching of the dielectric material, laser percussion micromachining of the dielectric material, cavitation-assisted etching of the dielectric material, or a combination of these and other mechanisms and/or techniques, using a direct-write ultrafast laser micromachining technique. The dielectric 120 can be transparent, partially transparent (e.g., translucent), or non-transparent (e.g., opaque) at the wavelength of the laser radiation being used, and can have a square, circular, rectangular, triangular, or any other suitable planar geometric shape profile. The channels 122 can be formed to have any of a circular, elliptical, or regular polygon shaped, or irregular cross-sectional shape; in some embodiments, different channels 122 can be formed to have a different cross-sectional shape from the other channels 122 formed in the dielectric 120. One or more ultrafast lasers are used in the direct-write channel-formation process. Such ultrafast lasers have pulse durations in the femtosecond to picosecond range, wavelengths in the UV-VIS-IR spectral region, energy per pulse on the order of about 0.1 microJoules (µJ) to about 100 µJ, and operate in either a single-pulse mode or in a burst mode, at repetition rates ranging from single-pulse (sub-Hz) to 2 MHz. Depending on the particular dielectric material from which the dielectric 120 is formed, each channel 122 can be formed by (1) a single ultrafast laser pulse, (2) a single burst-mode ultrafast laser pulse, (3) a succession of multiple single ultrafast laser pulses, or (4) a succession of multiple single burst-mode ultrafast laser pulses. Depending on the particular dielectric material from which the dielectric 120 is formed, the ultrafast laser pulses can be focused into (1) a Gaussian beam, with or without longitudinal spherical aberration, (2) a top-hat beam, (3) a Bessel beam, or (4) any other non-diffractive beam, using any combinations of transmission or reflective optics, including microscope objectives, axicons, waveplates, and spatial light modulators. One or more sets of focusing optics, forming one or multiple focused ultrafast laser beams, are used in the direct-write ultrafast laser micromachining process and can be used to form one channel 122 at a time (e.g., forming channels 122 sequentially) or to form multiple channels 122 simultaneously. In all embodiments, precise control of the working distance between the focusing optics and the surface of the work piece (e.g., the dielectric 120) is maintained throughout each step of the direct-write ultrafast laser micromachining process. In some instances, such as those that primarily involve either single ultrafast laser pulses or single burst-mode ultrafast laser pulses, a constant working distance between the focusing optics and the surface of the work piece is maintained. In some instances, such as those that primarily involve a succession of multiple single ultrafast laser pulses or a succession of multiple single burst-mode ultrafast laser pulses, the focus of the laser beam or the foci of the laser beams will be translated throughout the thickness of the dielectric solid when forming each of the channels 122. Once the direct-write ultrafast laser micromachining process has been completed, the dielectric 120 can be further treated to form the microfluidic chip-based thruster. For instance, borosilicate glass and fused silica microfluidic chips can be placed inside a base bath, such as hot (e.g., about 60° C. to about 100° C.) 5-10 molar aqueous potassium hydroxide ($KOH_{aq}$) for a period of about 5 minutes to about 120 minutes to remove micromachining debris and to enlarge the diameter of the channels 122, along with any other micromachined features. In an alternate embodiment, a short acid bath, for example, using buffered oxide etch (BOE), can be used to remove micromachining debris and to enlarge the diameter of the channels 122, along with any other micromachined features.

In some embodiments, a thruster (e.g., 100, 102, 103, 104) is provided to have a dielectric 120 in the form of a microfluidic chip. According to this embodiment, the dielectric 120 is solid and has one or more (e.g., a plurality of) channels 122 formed therein in the form of one or more (e.g., a plurality of) microcapillaries. The channels 122 are open on the opposing first and second longitudinal ends thereof and have a length, or height, of about 100 μm to about 1000 μm and have a width of about 0.1 μm to about 10 μm. A plurality of such channels 122 is provided, in some embodiments, in the form of an array, which can be formed according to (e.g., organized in) a regular, periodic, random, or non-random arrangement. In such embodiments, the dielectric 120 can be formed using additive manufacturing techniques, which can also be referred to as 3D printing techniques; examples of such additive manufacturing techniques include multiphoton polymerization direct laser writing of a resin, Micro-precision Projection Micro Stereolithography (PμSL) technology, Optomec's Aerosol Jet printing technology, or similar technology. In such embodiments, the dielectric 120 can be formed from a photocurable resin, a thermoplastic, a thermosetting polymer, an epoxy, a ceramic, and/or a composite material.

In some embodiments, a thruster (e.g., 100, 102, 103, 104) has a monolithic, or unitary, construction, or components and elements that have a monolithic, or unitary, construction, and are formed using direct-write ultrafast laser micromachining and/or additive manufacturing techniques.

In some embodiments, a dielectric 120 is formed as a microfluidic chip comprising one or more channels 122 formed therein in the form of one or more (e.g., a plurality of) microcapillaries. The channels 122 are open on the opposing first and second longitudinal ends thereof and have a length, or height, of about 100 μm to about 1000 μm and have a width of about 0.1 μm to about 10 μm. The channels 122 are formed in the dielectric 120 using direct-write ultrafast laser micromachining or additive manufacturing techniques. In some embodiments, the dielectric 120 can be used as a rigid filter or as a porous cavity separator or isolator in vacuum packaging or hermetic packaging of micro-electromechanical system (MEMS) and field emission electronics.

In some embodiments, a dielectric 120 is formed as a microfluidic chip comprising one or more channels 122 formed therein in the form of one or more (e.g., a plurality of) microcapillaries. The channels 122 are open on the opposing first and second longitudinal ends thereof and have a length, or height, of about 100 μm to about 1000 μm and have a width of about 0.1 μm to about 10 μm. The channels 122 are formed in the dielectric 120 using direct-write ultrafast laser micromachining or additive manufacturing techniques. In some embodiments, the dielectric 120 can be used for wicking a liquid into the microcapillaries via capillary action, for filtering liquid media, as a femtoliter well plate for chemical assays, chemical synthesis, or biomedical applications, or as a femtoliter reservoir for lubricants in precision mechanical systems.

In some embodiments, a thruster (e.g., 100, 102, 103, 104) is provided to have a dielectric 120 in the form of a microfluidic chip. According to this embodiment, the dielectric 120 comprises one or more channels 122 formed therein in the form of one or more (e.g., a plurality of) microcapillaries. The channels 122 are open on the opposing first and second longitudinal ends thereof and have a length, or height, of about 100 μm to about 1000 μm and have a width of about 0.1 μm to about 10 μm. The channels 122 are formed in the dielectric 120 using direct-write ultrafast laser micromachining or additive manufacturing techniques. In some embodiments, the dielectric 120 can be used for wicking a liquid via capillary action, as an emitter in electrospinning, as an emitter in an electrospray colloid generator, as an emitter in an electrospray nebulizer or atomizer, as an emitter in an electrospray colloidal thruster, as an emitter in an electrospray ion source, as an emitter in an electrospray ion thruster, as an emitter in a liquid metal ion source, or as an emitter in an ionization source in electrospray ionization mass spectrometry. The channels 122 in the dielectric 120 (e.g., in the form of a microfluidic emitter chip) open to a reservoir 110 containing a liquid (e.g., 112, FIGS. 1, 4) on the upstream surface of the dielectric 120 and an external, electrically conductive extraction electrode on the downstream surface of the dielectric 120. The downstream meniscus formed by the liquid inside a channel 122 can deform into a Taylor cone that ejects the liquid from the channel 122 by action of an electric field, which is formed when an electric potential difference (e.g., voltage) is applied between the liquid and the extraction electrode.

In some embodiments, a thruster (e.g., 100, 102, 103, 104) is provided to have a dielectric 120 in the form of a microfluidic chip. According to this embodiment, the dielectric 120 comprises one or more channels 122 formed therein in the form of one or more (e.g., a plurality of) microcapillaries. The channels 122 are open on the opposing first and second longitudinal ends thereof and have a length, or height, of about 100 μm to about 1000 μm and have a width of about 0.1 μm to about 10 μm. The channels 122 in the dielectric 120 (e.g., in the form of a microfluidic emitter chip) open to a reservoir 110 containing a liquid (e.g., 112, FIGS. 1, 4) on the upstream surface of the dielectric 120 and an external, electrically conductive extraction electrode on the downstream surface of the dielectric 120. The downstream surface of the dielectric 120 may be chemically treated to minimize wetting by the liquid contained in the reservoir 110. The upstream surface of the dielectric 120 and the surface of the channels 122 may be chemically treated to enhance wetting by the liquid being used.

In some embodiments, a thruster (e.g., 100, 102, 103, 104) is provided to have a dielectric 120 in the form of a microfluidic chip. According to this embodiment, the dielectric 120 comprises one or more channels 122 formed therein in the form of one or more (e.g., a plurality of) microcapillaries. The channels 122 are open on the opposing first and second longitudinal ends thereof and have a length, or height, of about 100 µm to about 1000 µm and have a width of about 0.1 µm to about 10 µm. The channels 122 in the dielectric 120 (e.g., in the form of a microfluidic emitter chip) open to a reservoir 110 containing a liquid (e.g., 112, FIGS. 1, 4) on the upstream surface of the dielectric 120 and an external, electrically conductive extraction electrode on the downstream surface of the dielectric 120. Particularly for applications for electrospinning and for electrospray colloid generation, the extraction electrode collects the material (e.g., the fluid) ejected from the channels 122 of the dielectric 120.

In some embodiments, a thruster (e.g., 100, 102, 103, 104) is provided to have a dielectric 120 in the form of a microfluidic chip. According to this embodiment, the dielectric 120 comprises one or more channels 122 formed therein in the form of one or more (e.g., a plurality of) microcapillaries. The channels 122 are open on the opposing first and second longitudinal ends thereof and have a length, or height, of about 100 µm to about 1000 µm and have a width of about 0.1 µm to about 10 µm. The channels 122 in the dielectric 120 (e.g., in the form of a microfluidic emitter chip) open to a reservoir 110 containing a liquid (e.g., 112, FIGS. 1, 4) on the upstream surface of the dielectric 120 and an external, electrically conductive extraction electrode on the downstream surface of the dielectric 120. For substantially all forms of material (e.g., fluid) that are ejected from the channels 122 of the dielectric 120, the extraction electrode is in a form of an extraction grid 160 that allows most of (e.g., the majority of, or substantially all of, such as at least 90%, at least 95%, at least 99%, etc.) the material (e.g., fluid) ejected from the channels 122 of the dielectric 120 to pass. The openings in the extraction grid 160 can have a cross-sectional shape that is circular, a shape of a regular polygon, such as triangular, square, or hexagonal, or any other suitable shape. It is advantageous in such embodiments for the channels 122 in the dielectric 120 to be centered and aligned with (e.g., coaxial with) the openings formed within the extraction grid 160.

In some embodiments, a thruster (e.g., 100, 102, 103, 104) is provided to have a dielectric 120 in the form of a microfluidic chip. According to this embodiment, the dielectric 120 comprises one or more channels 122 formed therein in the form of one or more (e.g., a plurality of) microcapillaries. The channels 122 are open on the opposing first and second longitudinal ends thereof and have a length, or height, of about 100 µm to about 1000 µm and have a width of about 0.1 µm to about 10 µm. The channels 122 in the dielectric 120 (e.g., in the form of a microfluidic emitter chip) open to a reservoir 110 containing a liquid (e.g., 112, FIGS. 1, 4) on the upstream surface of the dielectric 120 and an external, electrically conductive extraction grid 160, or electrode, on the downstream surface of the dielectric 120. In such embodiments, the liquid is an ionic liquid (IL) propellant 112 and the channels 122 formed in the dielectric 120 can be used as an emitter in an electrospray colloidal thruster or in an electrospray ion thruster.

In some embodiments, a dielectric 120 is formed as a microfluidic chip comprising one or more channels 122 formed therein in the form of one or more (e.g., a plurality of) microcapillaries. The channels 122 are open on the opposing first and second longitudinal ends thereof and have a length, or height, of about 100 µm to about 1000 µm and have a width of about 0.1 µm to about 10 µm. In some such embodiments, the dielectric 120 is a consumable component, such as a replaceable emitter chip for electrospinning machines, electrospray colloid generators and thrusters, and/or electrospray ion sources and thrusters.

In some embodiments, a dielectric 120 is formed as a microfluidic chip comprising one or more channels 122 formed therein in the form of one or more (e.g., a plurality of) microcapillaries. The channels 122 are open on the opposing first and second longitudinal ends thereof and have a length, or height, of about 100 µm to about 1000 µm and have a width of about 0.1 µm to about 10 µm. In some such embodiments, the dielectric 120 is a consumable component, such as a replaceable emitter chip for electric propulsion systems developed or commercialized by others that provide an external extraction grid, as well as all necessary and auxiliary electrical components and controls, mechanical structures and fixtures, propellant systems, electric power systems, and monitoring systems.

In some embodiments, a thruster (e.g., 100, 103, 104) is provided to have a dielectric 120 in the form of a microfluidic chip formed using direct-write ultrafast laser micromachining and/or additive manufacturing techniques. According to this embodiment, the dielectric 120 comprises one or more channels 122 formed therein in the form of one or more (e.g., a plurality of) microcapillaries, as well as one or more surface cavities 124 formed therein. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. According to this embodiment, the dielectric 120 comprises, on the downstream surface thereof, a plurality of channel-surface cavity pairs that are arranged in an array that is arranged according to a regular, periodic, random, or non-random arrangement. In some such embodiments, such a dielectric 120 can be used as a filter for liquid media, as a femtoliter well plate, such as for chemical assays, chemical synthesis, or biomedical applications, or as a femtoliter reservoir for lubricants in precision mechanical systems.

In some embodiments, a thruster (e.g., 100, 103, 104) is provided to have a dielectric 120 in the form of a microfluidic chip formed using direct-write ultrafast laser micromachining and/or additive manufacturing techniques. According to this embodiment, the dielectric 120 comprises one or more channels 122 formed therein in the form of one or more (e.g., a plurality of) microcapillaries, as well as one or more surface cavities 124 formed therein. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. According to this embodiment, the dielectric 120 comprises, on the downstream surface thereof, a plurality of channel-surface cavity pairs that are arranged in an array according to a regular, periodic, random, or non-random arrangement. In some such embodiments, the dielectric 120 can be used as an emitter in electrospinning, as an emitter in an electrospray colloid generator, as an emitter in an electrospray colloidal thruster, as an emitter in an electrospray nebulizer or atomizer, as an emitter in an electrospray ion source, as an emitter in an electrospray ion thruster, as an emitter in a liquid metal ion source, or as an emitter in an ionization source in electrospray ionization mass spectrometry. The channels 122 of the dielectric 120 open to a reservoir on the upstream surface of the dielectric 120 and the surface cavities 124 which face an external electrically conductive extraction electrode on the downstream surface of the dielectric 120. The meniscus formed by the liquid in a channel 122 on the downstream surface of the dielectric 120 can deform into a Taylor cone that ejects the liquid by action of an electric field which forms when an electric potential difference (e.g., voltage) is applied between the liquid and the extraction electrode.

In some embodiments, a thruster (e.g., 100, 103, 104) is provided to have a dielectric 120 in the form of a microfluidic chip formed using direct-write ultrafast laser micromachining and/or additive manufacturing techniques. According to this embodiment, the dielectric 120 comprises one or more channels 122 formed therein in the form of one or more (e.g., a plurality of) microcapillaries, as well as one or more surface cavities 124 formed therein. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. According to this embodiment, the dielectric 120 comprises, on the downstream surface thereof, a plurality of channel-surface cavity pairs that are arranged in an array according to a regular, periodic, random, or non-random arrangement. In some such embodiments, the downstream surface of the dielectric 120, including the surfaces inside the surface cavity 124, may be chemically treated to minimize wetting by the liquid contained within the reservoir 110. The upstream surface of the dielectric 120 and the surface of the channels 122 may be chemically treated to enhance wetting by the liquid contained within the reservoir 110.

In some embodiments, a thruster (e.g., 100, 103, 104) is provided to have a dielectric 120 in the form of a microfluidic chip formed using direct-write ultrafast laser micromachining and/or additive manufacturing techniques. According to this embodiment, the dielectric 120 comprises one or more channels 122 formed therein in the form of one or more (e.g., a plurality of) microcapillaries, as well as one or more surface cavities 124 formed therein. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. According to this embodiment, the dielectric 120 comprises, on the downstream surface thereof, a plurality of channel-surface cavity pairs that are arranged in an array according to a regular, periodic, random, or non-random arrangement. In some such embodiments, the dielectric 120 is configured for use in electrospinning and electrospray colloid generation, the extraction electrode being used to collect the material (e.g., fluid) that is ejected from the channels 122 of the dielectric 120.

In some embodiments, a thruster (e.g., 100, 103, 104) is provided to have a dielectric 120 in the form of a microfluidic chip formed using direct-write ultrafast laser micromachining and/or additive manufacturing techniques. According to this embodiment, the dielectric 120 comprises one or more channels 122 formed therein in the form of one or more (e.g., a plurality of) microcapillaries, as well as one or more surface cavities 124 formed therein. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. According to this embodiment, the dielectric 120 comprises, on the downstream surface thereof, a plurality of channel-surface cavity pairs that are arranged in an array according to a regular, periodic, random, or non-random arrangement. For substantially all forms of material (e.g., fluid) that are ejected from the channels 122 of the dielectric 120, the extraction electrode is in a form of an extraction grid 160 that allows most of (e.g., the majority of, or substantially all of, such as at least 90%, at least 95%, at least 99%, etc.) the material (e.g., fluid) ejected from the channels 122 of the dielectric 120 to pass. The openings in the extraction grid 160 can have a cross-sectional shape that is circular, a shape of a regular polygon, such as triangular, square, or hexagonal, or any other suitable shape. It is advantageous in such embodiments for the channels 122 in the dielectric 120 to be centered and aligned with (e.g., coaxial with) the openings formed within the extraction grid 160.

In some embodiments, a thruster (e.g., 100, 103, 104) is provided to have a dielectric 120 in the form of a microfluidic chip formed using direct-write ultrafast laser micromachining and/or additive manufacturing techniques. According to this embodiment, the dielectric 120 comprises one or more channels 122 formed therein in the form of one or more (e.g., a plurality of) microcapillaries, as well as one or more surface cavities 124 formed therein. The channels 122 are open on the opposing first and second longitudinal ends thereof and have a length, or height, of about 100 μm to about 1000 μm and have a width of about 0.1 μm to about 10 μm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 μm to about 100 μm, a depth of about 1 μm to about 100 μm, and be centered and axially aligned with the corresponding channel 122. According to this embodiment, the liquid is an ionic liquid (IL) propellant 112 and the channels 122 formed in the dielectric 120 can be used as an emitter in an electrospray colloidal thruster or in an electrospray ion thruster.

In some embodiments, a thruster (e.g., 100, 103, 104) is provided to have a dielectric 120 in the form of a microfluidic chip formed using direct-write ultrafast laser micromachining and/or additive manufacturing techniques. According to this embodiment, the dielectric 120 comprises one or more channels 122 formed therein in the form of one or more (e.g., a plurality of) microcapillaries, as well as one or more surface cavities 124 formed therein. The channels 122 are open on the opposing first and second longitudinal ends thereof and have a length, or height, of about 100 μm to about 1000 μm and have a width of about 0.1 μm to about 10 μm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 μm to about 100 μm, a depth of about 1 μm to about 100 μm, and be centered and axially aligned with the corresponding channel 122. According to this embodiment, the dielectric 120 is a consumable component, such as a replaceable emitter chip for electrospinning machines, electrospray colloid generators and thrusters, and/or electrospray ion sources and thrusters.

In some embodiments, a thruster (e.g., 100, 103, 104) is provided to have a dielectric 120 in the form of a microfluidic chip formed using direct-write ultrafast laser micromachining and/or additive manufacturing techniques. According to this embodiment, the dielectric 120 comprises one or more channels 122 formed therein in the form of one or more (e.g., a plurality of) microcapillaries, as well as one or more surface cavities 124 formed therein. The channels 122 are open on the opposing first and second longitudinal ends thereof and have a length, or height, of about 100 μm to about 1000 μm and have a width of about 0.1 μm to about 10 μm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 μm to about 100 μm, a depth of about 1 μm to about 100 μm, and be centered and axially aligned with the corresponding channel 122. According to this embodiment, the dielectric 120 is a consumable component, such as a replaceable emitter chip for electric propulsion systems developed or commercialized by others that provide an external extraction grid, as well as all necessary and auxiliary electrical components and controls, mechanical structures and fixtures, propellant systems, electric power systems, and monitoring systems.

In some embodiments, a thruster (e.g., 100, 104) is provided to have a dielectric 120 in the form of a microfluidic chip formed using direct-write ultrafast laser micromachining and/or additive manufacturing techniques. According to this embodiment, the dielectric 120 comprises one or more channels 122 formed therein in the form of one or more (e.g., a plurality of) microcapillaries and one or more surface cavities 124. The channels 122 are open on the opposing first and second longitudinal ends thereof and have a length, or height, of about 100 μm to about 1000 μm and have a width of about 0.1 μm to about 10 μm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 μm to about 100 μm, a depth of about 1 μm to about 100 μm, and be centered and axially aligned with the corresponding channel 122. A plurality of these channel-surface cavity pairs are arranged in an array that is a regular, periodic, random, or non-random arrangement. Except inside the surface cavities 124, the downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120. This electrically conductive coating (e.g., a conformal coating) on the downstream side of the dielectric 120 can be formed as an evaporated or sputter-coated metal film, an electrically conductive oxide film (e.g., indium tin oxide (ITO)), an electrically conductive polymer film (e.g., Poly(3,4-ethylenedioxythiophene) (PEDOT)), or a deposit of electrically conductive metal powders, carbon nanotubes, graphene, or nanowire meshes. In some embodiments of such a dielectric 120 with an "on-chip" extraction grid 160, none of the edges of the electrically conductive coating are lined or coated with a bus-bar strip of electrically conductive material to facilitate electrical contact. In some embodiments of such a dielectric 120 with an "on-chip" extraction grid 160, one of the edges of the electrically conductive coating are lined or coated with a bus-bar strip of electrically conductive material to facilitate electrical contact. In some embodiments of such a dielectric 120 with an "on-chip" extraction grid 160, two or more of (e.g., a plurality of) the edges of the electrically conductive coating are lined or coated with a bus-bar strip of electrically conductive material to facilitate electrical contact.

In some embodiments, a thruster (e.g., 100, 104) is provided to have a dielectric 120 in the form of a microfluidic chip formed using direct-write ultrafast laser micromachining and/or additive manufacturing techniques. According to this embodiment, the dielectric 120 comprises one or more channels 122 formed therein in the form of one or more (e.g., a plurality of) microcapillaries and one or more surface cavities 124. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. A plurality of these channel-surface cavity pairs are arranged in an array that is a regular, periodic, random, or non-random arrangement. Except inside the surface cavities 124, the downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120. In some such embodiments, the thruster (e.g., 100, 104) can be used as an electrospinning nozzle, as an electrospray colloid generator, as an electrospray colloidal thruster, as an electrospray nebulizer or atomizer, as an electrospray ion source, as an electrospray ion thruster, as a liquid metal ion source, or as an ionization source in electrospray ionization mass spectrometry. In this dielectric 120, the surface cavities 124 and the extraction grid 160 face the external environment on the downstream surface of the dielectric 120. The meniscus formed by the liquid in a channel 122 on the downstream surface of the dielectric 120 can deform into a Taylor cone that ejects the liquid by action of an electric field which forms when an electric potential difference (e.g., voltage) is applied between the liquid and the extraction electrode.

In some embodiments, a thruster (e.g., 100, 104) is provided to have a dielectric 120 in the form of a microfluidic chip formed using direct-write ultrafast laser micromachining and/or additive manufacturing techniques. According to this embodiment, the dielectric 120 comprises one or more channels 122 formed therein in the form of one or more (e.g., a plurality of) microcapillaries and one or more surface cavities 124. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. A plurality of these channel-surface cavity pairs are arranged in an array that is a regular, periodic, random, or non-random arrangement. Except inside the surface cavities 124, the downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120. In some such embodiments, the upstream surface of the dielectric 120 is coated or lined with an electrically conductive layer, with or without bus-bar strips on the edges thereof, that can be used to apply an electric potential to the liquid, or to measure the electric potential of the liquid.

In some embodiments, a thruster (e.g., 100, 104) is provided to have a dielectric 120 in the form of a microfluidic chip formed using direct-write ultrafast laser micromachining and/or additive manufacturing techniques. According to this embodiment, the dielectric 120 comprises one or more channels 122 formed therein in the form of one or more (e.g., a plurality of) microcapillaries and one or more surface cavities 124. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. A plurality of these channel-surface cavity pairs are arranged in an array that is a regular, periodic, random, or non-random arrangement. Except inside the surface cavities 124, the downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120. Thus, the extraction distance is defined by the depth of the cavity 124. In some such embodiments, the downstream surface of the dielectric 120, including the surfaces inside the surface cavities 124 formed therein, are chemically treated to minimize wetting of such surfaces by the liquid contained within the reservoir 110. The upstream surface of the dielectric and the surface of the microcapillaries may be chemically treated to enhance wetting by the liquid being used.

In some embodiments, a thruster (e.g., 100, 104) is provided to have a dielectric 120 in the form of a microfluidic chip formed using direct-write ultrafast laser micromachining and/or additive manufacturing techniques. According to this embodiment, the dielectric 120 comprises one or more channels 122 formed therein in the form of one or more (e.g., a plurality of) microcapillaries and one or more surface cavities 124. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. A plurality of these channel-surface cavity pairs are arranged in an array that is a regular, periodic, random, or non-random arrangement. Except inside the surface cavities 124, the downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120. Thus, the extraction distance is defined by the depth of the cavity 124. In some such embodiments, the thruster (e.g., 100, 104) can be used as a nozzle in electrospinning and for electrospray colloid generation, such that the material (e.g., fluid) ejected from the channels 122 of the dielectric 120 is collected on an external surface.

In some embodiments, a thruster (e.g., 100, 104) is provided to have a dielectric 120 in the form of a microfluidic chip formed using direct-write ultrafast laser micromachining and/or additive manufacturing techniques. According to this embodiment, the dielectric 120 comprises one or more channels 122 formed therein in the form of one or more (e.g., a plurality of) microcapillaries and one or more surface cavities 124. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. A plurality of these channel-surface cavity pairs are arranged in an array that is a regular, periodic, random, or non-random arrangement. Except inside the surface cavities 124, the downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120. Thus, the extraction distance is defined by the depth of the cavity 124. In some such embodiments, the liquid supplied to the dielectric 120 is an ionic liquid (IL) propellant 112 and the thruster (e.g., 100, 104) can be used as an electrospray colloidal thruster or an electrospray ion thruster.

In some embodiments, a thruster (e.g., 100, 104) is provided to have a dielectric 120 in the form of a microfluidic chip formed using direct-write ultrafast laser micromachining and/or additive manufacturing techniques. According to this embodiment, the dielectric 120 comprises one or more channels 122 formed therein in the form of one or more (e.g., a plurality of) microcapillaries and one or more surface cavities 124. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. A plurality of these channel-surface cavity pairs are arranged in an array that is a regular, periodic, random, or non-random arrangement. Except inside the surface cavities 124, the downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120. Thus, the extraction distance is defined by the depth of the cavity 124. In some such embodiments, the thruster (e.g., 100, 104) is a consumable component, such as a replaceable emitter chip for electrospinning machines, electrospray colloid generators and thrusters, and/or electrospray ion sources and thrusters.

In some embodiments, a thruster (e.g., 100, 104) is provided to have a dielectric 120 in the form of a microfluidic chip formed using direct-write ultrafast laser micromachining and/or additive manufacturing techniques. According to this embodiment, the dielectric 120 comprises one or more channels 122 formed therein in the form of one or more (e.g., a plurality of) microcapillaries and one or more surface cavities 124. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. A plurality of these channel-surface cavity pairs are arranged in an array that is a regular, periodic, random, or non-random arrangement. Except inside the surface cavities 124, the downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120. Thus, the extraction distance is defined by the depth of the cavity 124. In some such embodiments, the thruster (e.g., 100, 104) is a consumable component, such as a replaceable emitter chip for electric propulsion systems developed or commercialized by others that provide all necessary and auxiliary electrical components and controls, mechanical structures and fixtures, propellant systems, electric power systems, and monitoring systems.

In some embodiments, a thruster (e.g., 100, 104) is provided to have a dielectric 120 in the form of a microfluidic chip formed using direct-write ultrafast laser micromachining and/or additive manufacturing techniques. According to this embodiment, the dielectric 120 comprises one or more channels 122 formed therein in the form of one or more (e.g., a plurality of) microcapillaries and one or more surface cavities 124. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. A plurality of these channel-surface cavity pairs are arranged in an array that is a regular, periodic, random, or non-random arrangement. Except inside the surface cavities 124, the downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120. Thus, the extraction distance is defined by the depth of the cavity 124. In some such embodiments, the thruster (e.g., 100, 104) is the multi-nozzle atomizer element of an electrohydrodynamic printer.

In some embodiments, a thruster (e.g., 100, 104) is provided to have a dielectric 120 in the form of a microfluidic chip formed using direct-write ultrafast laser micromachining and/or additive manufacturing techniques. According to this embodiment, the dielectric 120 comprises one or more channels 122 formed therein in the form of one or more (e.g., a plurality of) microcapillaries and one or more surface cavities 124. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. A plurality of these channel-surface cavity pairs are arranged in an array that is a regular, periodic, random, or non-random arrangement. Except inside the surface cavities 124, the downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120. Thus, the extraction distance is defined by the depth of the cavity 124. In some such embodiments, the thruster (e.g., 100, 104) is the multi-nozzle nebulizer element of a fuel injection system.

In some embodiments, a thruster (e.g., 100, 102, 103, 104) is provided in the form of a microfluidic chip comprising a dielectric 120, which is solid and has one or more (e.g., a plurality of) channels 122 formed therein in the form of one or more (e.g., a plurality of) microcapillaries. The channels 122 are open on the opposing first and second longitudinal ends thereof and have a length, or height, of about 100 µm to about 1000 µm and have a width of about 0.1 µm to about 10 µm and are capable of wicking a liquid via capillary action. A plurality of such channels 122 is provided, in some embodiments, in the form of an array, which can be formed according to (e.g., organized in) a regular, periodic, random, or non-random arrangement. The diameter, the height, and the arrangement of the channels 122 in the dielectric 120 are optimized to minimize the onset voltage for Taylor cone formation, as a function of the dielectric constant of the dielectric material, using computational simulations. Low onset voltages are attained for dielectrics 120 formed from dielectric materials with relative permittivities lower than 12, for channels 122 with diameters less than 10 µm, for channels 122 with heights greater than 400 µm, and for channels 122 that are spaced from nearest adjacent channels 122 by a distance that is about one to three times the thickness of the dielectric 120. In some embodiments, the array of channels is positioned within the dielectric 120 according to a hexagonal arrangement to maximize the density of the emitters, or channels 122, in the dielectric 120.

In some embodiments, a thruster (e.g., 100, 103, 104) is provided in the form of a microfluidic chip comprising a dielectric 120, which is solid and has one or more (e.g., a plurality of) channels 122 formed therein in the form of one or more (e.g., a plurality of) microcapillaries and one or more surface cavities 124. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 μm to about 100 μm, a depth of about 1 μm to about 100 μm, and be centered and axially aligned with the corresponding channel 122. A plurality of these channel-surface cavity pairs are arranged in an array that is a regular, periodic, random, or non-random arrangement. The diameter, the height, and the arrangement of the channel-surface cavity pairs in a dielectric 120 are optimized to minimize the onset voltage for Taylor cone formation, as a function of the dielectric constant of the dielectric material, using computational simulations. Low onset voltages are attained for dielectrics 120 formed from dielectric materials with relative permittivities lower than 12, for channels 122 with diameters less than 10 μm, for channels 122 with heights greater than 400 μm, and for channel-surface cavity pairs that are spaced from nearest adjacent channel-surface cavity pairs by a distance that is about one to three times the thickness of the dielectric 120. In some embodiments, the array of channel-surface cavity pairs is positioned within the dielectric 120 according to a hexagonal arrangement to maximize the density of the emitters, or channel-surface cavity pairs, in the dielectric 120.

In some embodiments, a thruster (e.g., 100, 104) is provided in the form of a microfluidic chip comprising a dielectric 120, which is solid and comprises one or more channels 122 formed therein in the form of one or more (e.g., a plurality of) microcapillaries and one or more surface cavities 124. The channels 122 are open on the opposing first and second longitudinal ends thereof and have a length, or height, of about 100 μm to about 1000 μm and have a width of about 0.1 μm to about 10 μm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 μm to about 100 μm, a depth of about 1 μm to about 100 μm, and be centered and axially aligned with the corresponding channel 122. A plurality of these channel-surface cavity pairs are arranged in an array that is a regular, periodic, random, or non-random arrangement. Except inside the surface cavities 124, the downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120. Thus, the extraction distance is defined by the depth of the cavity 124. The diameter, the height, and the arrangement of the channel-surface cavity pairs in such dielectric 120 are optimized to minimize the onset voltage for Taylor cone formation, as a function of the dielectric constant of the dielectric material, using computational simulations. Low onset voltages are attained for dielectrics 120 formed from dielectric materials with relative permittivities lower than 12, for channels 122 with diameters less than 10 μm, for channels 122 with heights greater than 400 μm, and for channel-surface cavity pairs that are spaced from nearest adjacent channel-surface cavity pairs by a distance that is about one to three times the thickness of the dielectric 120. In some embodiments, the array of channel-surface cavity pairs is positioned within the dielectric 120 according to a hexagonal arrangement to maximize the density of the emitters, or channel-surface cavity pairs, in the dielectric 120.

In some embodiments, a thruster (e.g., 100, 102, 103, 104) is provided in the form of a microfluidic chip comprising a dielectric 120, which is solid and has one or more (e.g., a plurality of) channels 122 formed therein in the form of one or more (e.g., a plurality of) microcapillaries. A plurality of these channels 122 are arranged in an array that is a regular, periodic, random, or non-random arrangement. In some embodiments, the dielectric 120 is formed of a dielectric material that has a relative electric permittivity lower than 12, such as a silica aerogel, a metal oxide aerogel, a polymer aerogel, polymers like Teflon, including polytetrafluoroethylene (PTFE), perfluoroalkoxy alkane (PFA), and fluorinated ethylene propylene (FEP), polymers like polyetheretherketone (PEEK), Kapton (polyimide), and polyethylene terephthalate (PET), and any other suitable materials, including porous glass, glass, glass-ceramic, borosilicate glass, fused silica, and sapphire.

In some embodiments, a thruster (e.g., 100, 103, 104) is provided in the form of a microfluidic chip comprising a dielectric 120, which is solid and has one or more (e.g., a plurality of) channels 122 formed therein in the form of one or more (e.g., a plurality of) microcapillaries and one or more surface cavities 124. The channels 122 are open on the opposing first and second longitudinal ends thereof and have a length, or height, of about 100 μm to about 1000 μm and have a width of about 0.1 μm to about 10 μm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 μm to about 100 μm, a depth of about 1 μm to about 100 μm, and be centered and axially aligned with the corresponding channel 122. A plurality of these channel-surface cavity pairs are arranged in an array that is a regular, periodic, random, or non-random arrangement. In some embodiments, the dielectric 120 is formed of a dielectric material that has a relative electric permittivity lower than 12, such as a silica aerogel, a metal oxide aerogel, a polymer aerogel, polymers like Teflon, including polytetrafluoroethylene (PTFE), perfluoroalkoxy alkane (PFA), and fluorinated ethylene propylene (FEP), polymers like polyetheretherketone (PEEK), Kapton (polyimide), and polyethylene terephthalate (PET), and any other suitable materials, including porous glass, glass, glass-ceramic, borosilicate glass, fused silica, and sapphire.

In some embodiments, a thruster (e.g., 100, 104) is provided in the form of a microfluidic chip comprising a dielectric 120, which is solid and comprises one or more channels 122 formed therein in the form of one or more (e.g., a plurality of) microcapillaries and one or more surface cavities 124. The channels 122 are open on the opposing first and second longitudinal ends thereof and have a length, or height, of about 100 μm to about 1000 μm and have a width of about 0.1 μm to about 10 μm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 μm to about 100 μm, a depth of about 1 μm to about 100 μm, and be centered and axially aligned with the corresponding channel 122. A plurality of these channel-surface cavity pairs are arranged in an array that is a regular, periodic, random, or non-random arrangement, in the form of a microfluidic chip comprising a dielectric 120, which is solid and downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120. Thus, the extraction distance is defined by the depth of the cavity 124. In some embodiments, the dielectric 120 and the dielectric spacer 140 are formed of one or more dielectric materials that have relative electric permittivities lower than 12, such as a silica aerogel, a metal oxide aerogel, a polymer aerogel, polymers like Teflon, including polytetrafluoroethylene (PTFE), perfluoroalkoxy alkane (PFA), and fluorinated ethylene propylene (FEP), polymers like polyetheretherketone (PEEK), Kapton (polyimide), and polyethylene terephthalate (PET), and any other suitable materials, including porous glass, glass, glass-ceramic, borosilicate glass, fused silica, and sapphire.

In some embodiments, a thruster (e.g., 100, 104) is provided in the form of a microfluidic chip comprising a dielectric 120, which is solid and comprises one or more channels 122 formed therein in the form of one or more (e.g., a plurality of) microcapillaries and one or more surface cavities 124. The channels 122 are open on the opposing first and second longitudinal ends thereof and have a length, or height, of about 100 μm to about 1000 μm and have a width of about 0.1 μm to about 10 μm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 μm to about 100 μm, a depth of about 1 μm to about 100 μm, and be centered and axially aligned with the corresponding channel 122. A plurality of these channel-surface cavity pairs are arranged in an array that is a regular, periodic, random, or non-random arrangement. Except inside the surface cavities 124, the downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120. Thus, the extraction distance is defined by the depth of the cavity 124.

by the depth of the cavity 124. The shape, height, width, and taper of the surface cavities 124 in such a thruster (e.g., 100, 104) are optimized to minimize the onset voltage for Taylor cone formation, as a function of the dielectric constant of the dielectric material, using computational simulations. Low onset voltages are attained for surface cavities 124 that are shallow and narrow. More specifically, for a surface cavity of depth d and width m, the onset voltage has a minimum value for a surface cavity with a depth that is less than about 20 μm and a width that is less than about 40 μm.

In some embodiments, a thruster (e.g., 100, 104) is provided in the form of a microfluidic chip comprising a dielectric 120, which is solid and comprises one or more channels 122 formed therein in the form of one or more (e.g., a plurality of) microcapillaries and one or more surface cavities 124. The channels 122 are open on the opposing first and second longitudinal ends thereof and have a length, or height, of about 100 μm to about 1000 μm and have a width of about 0.1 μm to about 10 μm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 μm to about 100 μm, a depth of about 1 μm to about 100 μm, and be centered and axially aligned with the corresponding channel 122. A plurality of these channel-surface cavity pairs are arranged in an array that is a regular, periodic, random, or non-random arrangement. Except inside the surface cavities 124, the downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120. Thus, the extraction distance is defined by the depth of the cavity 124. In such embodiments, the thruster (e.g., 100, 104) configured for use as an electrospray colloidal thruster or as an electrospray ion thruster can have the dielectric 120 with channels 122 of different diameters that form Taylor cones at different onset voltages, thereby allowing the applied operating voltage to function as a throttle, or a thrust lever, by varying the thrust density. The channel-surface cavity pairs of such a dielectric 120 can be arranged in a radial gradient configuration of increasing or decreasing diameters, or any other non-random configuration. In some such embodiments, the dielectric 120 has surface cavities 124 of different respective depths and/or widths (e.g., diameters) that promote Taylor cone formation at different onset voltages, allowing the applied operating voltage to function as a throttle, or a thrust lever, by varying the thrust density. The channel-surface cavity pairs of such a dielectric 120 can be arranged in a radial gradient configuration of increasing or decreasing diameters, or any other non-random configuration.

In some embodiments, a thruster (e.g., 100, 102, 103, 104) is provided to have a dielectric 120 in the form of a microfluidic chip that comprises one or more channels 122 formed therein in the form of one or more (e.g., a plurality of) microcapillaries and one or more surface cavities 124. The channels 122 are open on the opposing first and second longitudinal ends thereof and have a length, or height, of about 100 μm to about 1000 μm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. A plurality of these channel-surface cavity pairs are arranged in an array that is a regular, periodic, random, or non-random arrangement. The downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120. Thus, the extraction distance is defined by the depth of the cavity 124. In such embodiments, the edge of the extraction grid 160 around each surface cavity 124 is receded by between 1 µm and 50 µm. Each extraction grid edge around each surface cavity 124 can have a circular shape, an elliptical shape, or a regular polygon shape such as triangular, or square, or hexagonal, and the Ike.

In some embodiments, a thruster (e.g., 100, 103, 104) is provided to have a dielectric 120 in the form of a microfluidic chip that comprises one or more channels 122 formed therein in the form of one or more (e.g., a plurality of) microcapillaries and one or more surface cavities 124. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. A plurality of these channel-surface cavity pairs are arranged in an array that is a regular, periodic, random, or non-random arrangement. The downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120. Thus, the extraction distance is defined by the depth of the cavity 124. Such a dielectric 120 can be configured for use as an electrospray colloidal thruster or as an electrospray ion thruster and, as shown in in the example embodiment of FIG. 7, has non-cylindrical surface cavities 124 surrounding the channels 122, non-concentric surface cavities 124 surrounding the channels 122, non-circular extraction grid 160 perimeters surrounding the surface cavities 124, and/or non-concentric extraction grid 160 perimeters surrounding the surface cavities 124, which offset the symmetry comprising a concentrically-located channel 122 and surface cavity 124 pair. This symmetry offset alters the angular direction of the net electric field from normal to the surface of the dielectric 120, so as to provide a non-normal vector component (e.g., angular incline) component to the thrust generated by the thruster 100, 103, 104, which advantageously allows the thruster 100, 103, 104 to provide for rotational motion control of the structure to which the thruster 100, 103, 104 is attached.

In some embodiments, a thruster (e.g., 100, 103, 104) is provided to have a dielectric 120 in the form of a microfluidic chip that comprises one or more channels 122 formed therein in the form of one or more (e.g., a plurality of) microcapillaries and one or more surface cavities 124. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. A plurality of these channel-surface cavity pairs are arranged in an array that is a regular, periodic, random, or non-random arrangement. The downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120. Thus, the extraction distance is defined by the depth of the cavity 124. Such a dielectric 120 can be configured for use as an electrospray colloidal thruster or as an electrospray ion thruster and, in such embodiments, has non-cylindrical surface cavities 124 surrounding the channels 122, non-concentric surface cavities 124 surrounding the channels 122, non-circular extraction grid 160 perimeters surrounding the surface cavities 124, or non-concentric extraction grid 160 perimeters surrounding the surface cavities 124, which offset the symmetry comprising a concentrically-located channel 122 and surface cavity 124 pair. This symmetry offset alters the angular direction of the net electric field from normal to the surface of the dielectric 120, so as to provide a non-normal vector component to the thrust generated by the thruster 100, 103, 104, which advantageously also allows the thruster 100, 103, 104 to provide for rotational motion control of the structure to which the thruster 100, 103, 104 is attached. In some embodiments the dielectric 120 comprises two separate, equal zones (e.g., having half-plane symmetry) of opposite angular biases that can each be operated individually to generate rotational motion about the orthogonal axis with opposite angular signs, or can be operated together (e.g., in unison) in which the angular biases of the two opposing zones cancel each other and result in net translational thrust normal to the surface of the thruster 100, 103, 104, in essence providing dual-mode thrust operation from a thruster 100, 103, 104 having a monolithic, or unitary, construction. This embodiment thus enables control over either pitch or yaw, depending on deployment positioning, and translation in one monolithic chip.

In some embodiments, a thruster (e.g., 100, 103, 104) is provided to have a dielectric 120 in the form of a microfluidic chip that comprises one or more channels 122 formed therein in the form of one or more (e.g., a plurality of) microcapillaries and one or more surface cavities 124. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. A plurality of these channel-surface cavity pairs are arranged in an array that is a regular, periodic, random, or non-random arrangement. The downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120. Such a dielectric 120 can be configured for use as an electrospray colloidal thruster or as an electrospray ion thruster and, in such embodiments, has non-cylindrical surface cavities 124 surrounding the channels 122, non-concentric surface cavities 124 surrounding the channels 122, non-circular extraction grid 160 perimeters surrounding the surface cavities 124, or non-concentric extraction grid 160 perimeters surrounding the surface cavities 124, which offset the symmetry comprising a concentrically-located channel 122 and surface cavity 124 pair. This symmetry offset alters the angular direction of the net electric field from normal to the surface of the dielectric 120, so as to provide a non-normal vector component to the thrust generated by the thruster 100, 103, 104, which advantageously also allows the thruster 100, 103, 104 to provide for rotational motion control of the structure to which the thruster 100, 103, 104 is attached. In some embodiments the dielectric 120 comprises three separate, equal zones (e.g., having three-fold rotational symmetry of 120°) with angular biases that can each be operated individually to generate rotational motion about an orthogonal axis, or can be operated in pairs to generate rotational motion about a composite orthogonal axis, or operated all together (e.g., in unison), in which the angular biases of the three zones cancel each other and result in net translational thrust normal to the surface of the thruster 100, 103, 104, in essence providing multimode thrust operation from a thruster 100, 103, 104 having a monolithic, or unitary, construction. This embodiment essentially enables thrust vectoring which includes pitch, yaw, and translation in one monolithic chip.

In some embodiments, a thruster (e.g., 100, 103, 104) is provided to have a dielectric 120 in the form of a microfluidic chip that comprises one or more channels 122 formed therein in the form of one or more (e.g., a plurality of) microcapillaries and one or more surface cavities 124. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. A plurality of these channel-surface cavity pairs are arranged in an array that is a regular, periodic, random, or non-random arrangement. The downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120. Thus, the extraction distance is defined by the depth of the cavity 124. Such a dielectric 120 can be configured for use as an electrospray colloidal thruster or as an electrospray ion thruster and, in such embodiments, has non-cylindrical surface cavities 124 surrounding the channels 122, non-concentric surface cavities 124 surrounding the channels 122, non-circular extraction grid 160 perimeters surrounding the surface cavities 124, or non-concentric extraction grid 160 perimeters surrounding the surface cavities 124, which offset the symmetry comprising a concentrically-located channel 122 and surface cavity 124 pair. This symmetry offset alters the angular direction of the net electric field from normal to the surface of the dielectric 120, so as to provide a non-normal vector component to the thrust generated by the thruster 100, 103, 104, which advantageously also allows the thruster 100, 103, 104 to provide for rotational motion control of the structure to which the thruster 100, 103, 104 is attached. In some embodiments the dielectric 120 comprises four separate, equal zones (e.g., quadrant geometry), wherein each quadrant's angular bias is rotated by 90° with respect to the neighboring quadrants. The two pairs of opposite angular bias thus comprise orthogonal axes in the plane of the chip. Each quadrant may be operated individually to effect rotational motion about the orthogonal axis, with opposing quadrants providing opposite signs of angular rotation. One pair, or both pairs, of opposing quadrants may be operated together, wherein the angular biases of opposing zones cancel each other and result in net translational thrust normal to the thruster chip surface, in essence providing multimode thrust operation from a thruster 100, 103, 104 having a monolithic, or unitary, construction. This embodiment essentially enables thrust vectoring which includes pitch, yaw, and dual-mode translation in one monolithic chip.

In some embodiments, a thruster (e.g., 100, 103, 104) is provided to have a dielectric 120 in the form of a microfluidic chip that comprises one or more channels 122 formed therein in the form of one or more (e.g., a plurality of) microcapillaries and one or more surface cavities 124. The channels 122 are open on the opposing first and second longitudinal ends thereof and have a length, or height, of about 100 µm to about 1000 µm and have a width of about 0.1 µm to about 10 µm and are capable of wicking a liquid via capillary action. Each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. Each surface cavity 124 can have a cross-sectional shape that is circular, a shape of a regular polygon, such as triangular, square, or hexagonal, or any other suitable shape, and can be tapered towards the corresponding channel 122. Each surface cavity 124 can have a width of about 1 µm to about 100 µm, a depth of about 1 µm to about 100 µm, and be centered and axially aligned with the corresponding channel 122. A plurality of these channel-surface cavity pairs are arranged in an array that is a regular, periodic, random, or non-random arrangement. The downstream surface of the dielectric 120 is lined or coated with an electrically conductive layer functioning as a local, "on-chip" extraction grid 160, such that the extraction grid 160 is not spaced apart from (e.g., is in direct contact with) the downstream surface of the dielectric 120. Such a dielectric 120 can be configured for use as an electrospray colloidal thruster or as an electrospray ion thruster. In some embodiments the dielectric 120 comprises five separate zones, of which one zone comprises the standard channel-surface cavity pairs described above, while the other four zones can all be of equal array pattern size and/or shape and/or dielectric 120 shape, but may differ in these aspects from the first zone. The first zone provides translational thrust normal to the surface of the thruster 100, 103, 104. The other four zones have non-cylindrical surface cavities 124 surrounding the channels 122, non-concentric surface cavities 124 surrounding the channels 122, non-circular extraction grid 160 perimeters surrounding the surface cavities 124, or non-concentric extraction grid 160 perimeters surrounding the surface cavities 124, which offset the symmetry comprising a concentrically-located channel 122 and surface cavity 124 pair. This symmetry offset alters the angular direction of the net electric field from normal to the surface of the dielectric 120, so as to provide a non-normal vector component to the thrust generated by the thruster 100, 103, 104, which advantageously also allows the thruster 100, 103, 104 to provide for rotational motion control of the structure to which the thruster 100, 103, 104 is attached. The other four zones comprise pairs of opposite angular biases that can each be operated individually to generate rotational motion about an orthogonal axis, in essence providing multimode thrust operation from a thruster 100, 103, 104 having a monolithic, or unitary, construction. In this embodiment, the relative thrust contributions to pitch, yaw, and translation can be allocated through the size of emitter arrays and/or dielectrics 120. This embodiment essentially enables thrust vectoring which includes pitch, yaw, and tri-mode translation in one monolithic chip.

Figure 8A:
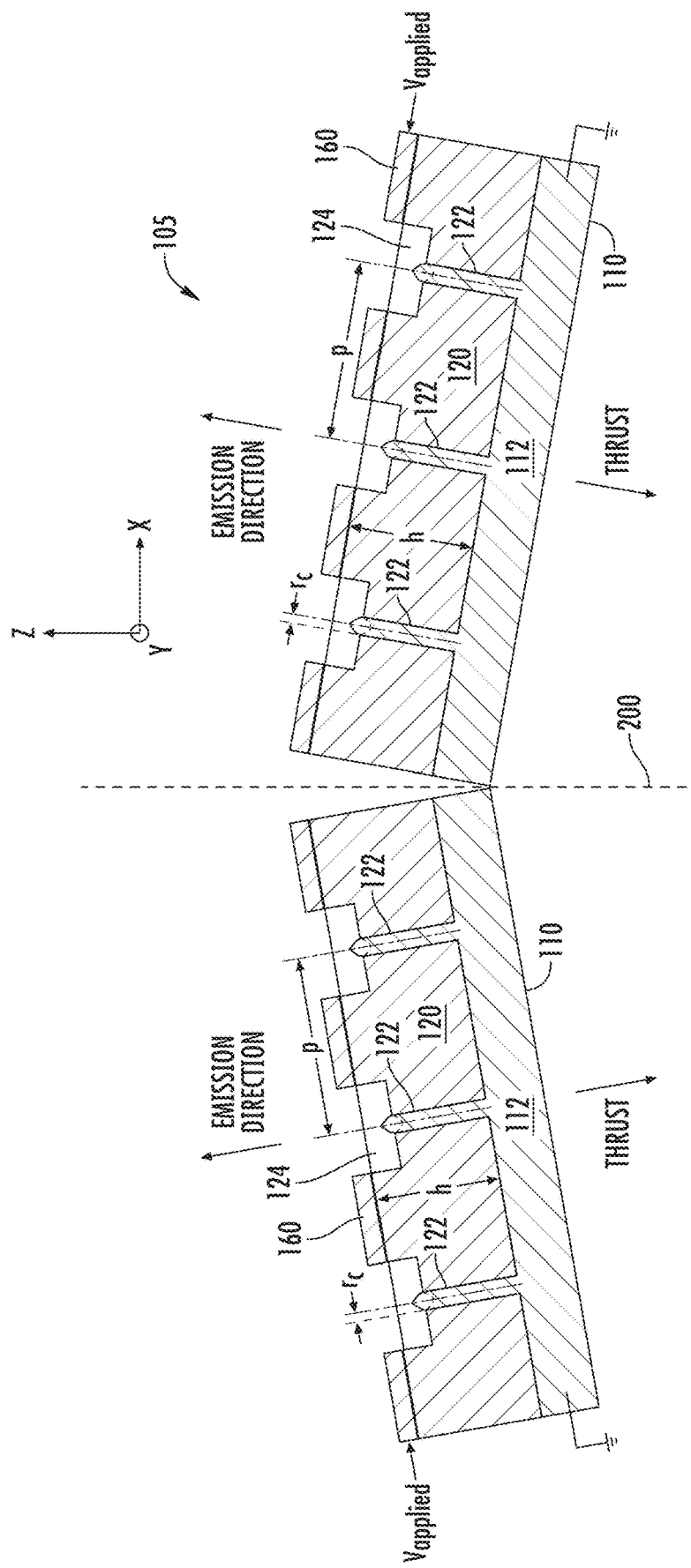
FIGS. 8A and 8B are respective schematic cross-sectional views of alternate arrangements for a sixth example embodiment of an electrospray thruster.
Figure 8B:
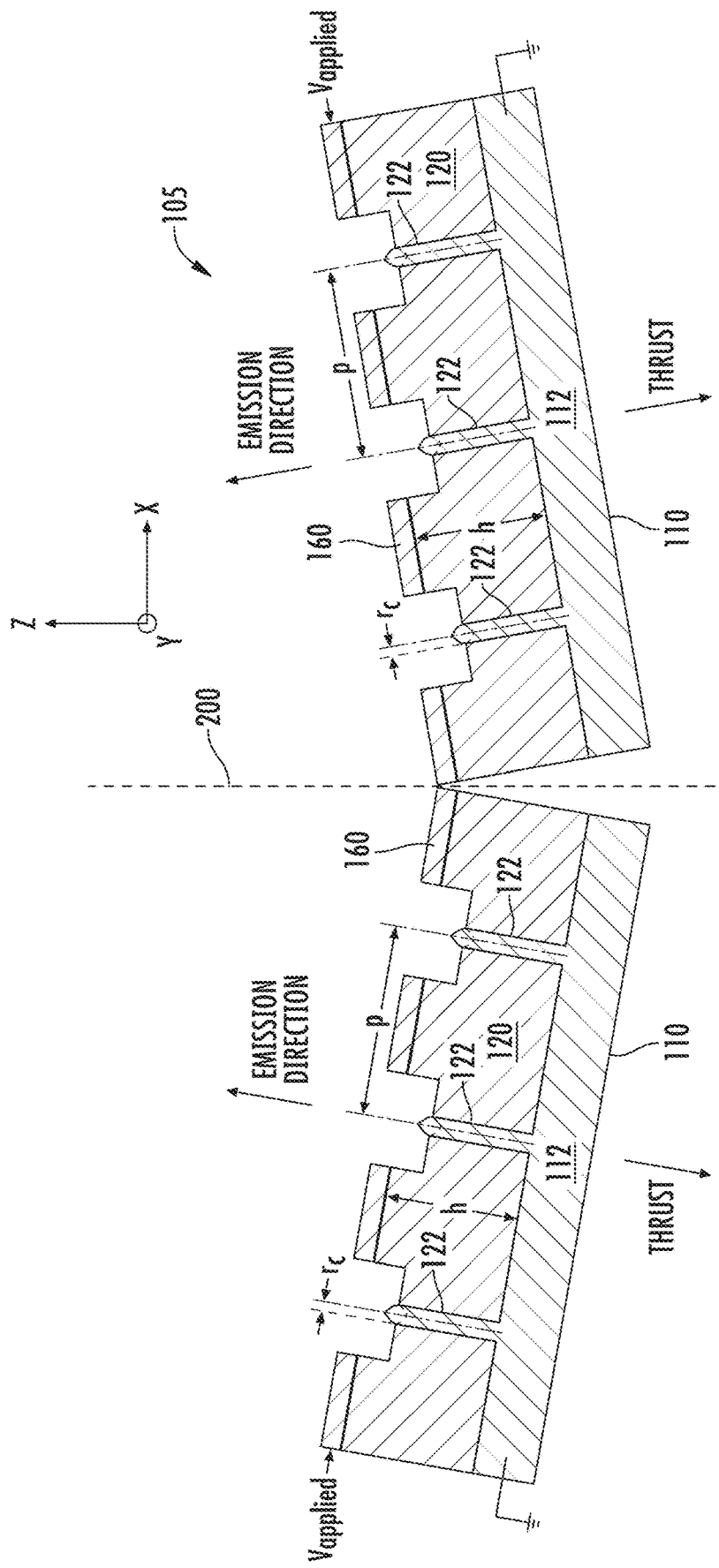

In FIGS. 8A and 8B, further example embodiments of a thruster, generally designated 105, is provided, the thruster 105 having a plurality of (e.g., two) dielectrics 120, each of which is in the form of a microfluidic chip, being solid and has one or more (e.g., a plurality of) channels 122 formed therein in the form of one or more (e.g., a plurality of) microcapillaries and, optionally, one or more surface cavities 124. In each dielectric 120, the channels 122 are open on the opposing first and second longitudinal ends thereof and have a length, or height, of about 100 µm to about 1000 µm and have a width of about 0.1 µm to about 10 µm and are capable of wicking a liquid via capillary action. In each dielectric 120, each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. In some embodiments, each dielectric 120 is formed with a dedicated reservoir 110 (e.g., in a monolithic, or unitary, manner). In some embodiments, the dielectrics 120 are both connected to a common, or shared, reservoir 110; in such embodiments, the two dielectrics 120 and the reservoir 110 can be formed as discrete components that are assembled together or in a monolithic, or unitary structure. In each dielectric 120, each surface cavity 124 can have a cross-sectional shape that is circular, a shape of a regular polygon, such as triangular, square, or hexagonal, or any other suitable shape, and can be tapered towards the corresponding channel 122. In each dielectric 120, each surface cavity 124 can have a width of about 1 µm to about 100 µm, a depth of about 1 µm to about 100 µm, and be centered and axially aligned with the corresponding channel 122. In each dielectric 120, a plurality of these channel-surface cavity pairs are arranged in an array that is a regular, periodic, random, or non-random arrangement. In FIGS. 8A and 8B, the downstream surface of each dielectric 120 is shown lined or coated with an electrically conductive layer functioning as a local, "on-chip" extraction grid 160, such that the extraction grid 160 is not spaced apart from (e.g., is in direct contact with) the downstream surface of the corresponding dielectric 120. Thus, the extraction distance is defined by the depth of the cavity 124. In some embodiments, however, the extraction grid 160 associated with each dielectric 120 may be spaced apart from the downstream surface thereof by an extraction distance (d). In some embodiments, the extraction grid 160 may be formed as a common, or shared (e.g., single), structure that is connected to an electrical ground; in some such embodiments, the extraction grid 160 can be spaced apart from the dielectrics 120 by an extraction distance (d).

As shown in FIGS. 8A and 8B, the thruster 105 is configured for use as an electrospray colloidal thruster or as an electrospray ion thruster, in which the dielectrics 120 are positioned relative to each other in an edge-to-edge arrangement, or nearly edge-to-edge, with the downstream surface of each of the dielectrics 120 being oriented at a small angle (e.g., about 5°, about 10°, about 15°, about 20°, about 30°, or about 45°) relative to a plane 200 (e.g., a plane of symmetry, in the vertical direction, along the z-axis, as shown in FIGS. 8A and 8B). In FIG. 8A, the dielectrics 120 are rotated such that the downstream surfaces thereof face away from each other, such that a small wedge deviation from a planar surface is formed. In FIG. 8B, the dielectrics 120 are rotated such that the downstream surfaces thereof face towards each other, such that a small trough deviation from a planar surface is formed. The relative inclination of the dielectrics 120 in the thruster 105, in both FIGS. 8A and 8B, is advantageous because an angular bias (e.g., relative to the plane 200) in the direction of the thrust from each dielectric 120 is generated, thereby enabling rotational motion control of the structure to which the thruster 105 is attached. The direction, or vector, of the thrust and the emission direction are generally designated using the corresponding arrows in the figures. In such embodiments of the thruster 105, emission of the IL propellant 112 from each dielectric 120 may be controlled individually, such that rotation about the plane 200 in either angular direction can be achieved by selectively activating emission of the IL propellant from the dielectric 120 that is inclined about the plane 200 in the direction opposite the intended direction of rotation. For example, in the arrangements of FIGS. 8A and 8B, to produce a counterclockwise direction of rotation of the thruster 105, the left dielectric 120 is activated. Due to the symmetrical inclination of the dielectrics 120 relative to the plane 200 in the arrangements of the thruster shown in FIGS. 8A and 8B, when both of the dielectrics 120 are activated simultaneously (e.g., by applying a same voltage differential), the angular biases of the two oppositely inclined dielectrics 120 are effective to cancel the laterally-oriented angular acceleration vector components of the thrust generated by each dielectric, such that a net translational thrust substantially coaxial with the plane 200 (e.g., in the z-direction) is generated. Thus, according to the embodiments shown in FIGS. 8A and 8B, the thruster 105 is operable as a dual-mode thruster, capable of generating rotary, or angular, movements, as well as generating translatory, or linear, movements of the structure to which the thruster 105 is attached.

Figure 9A:
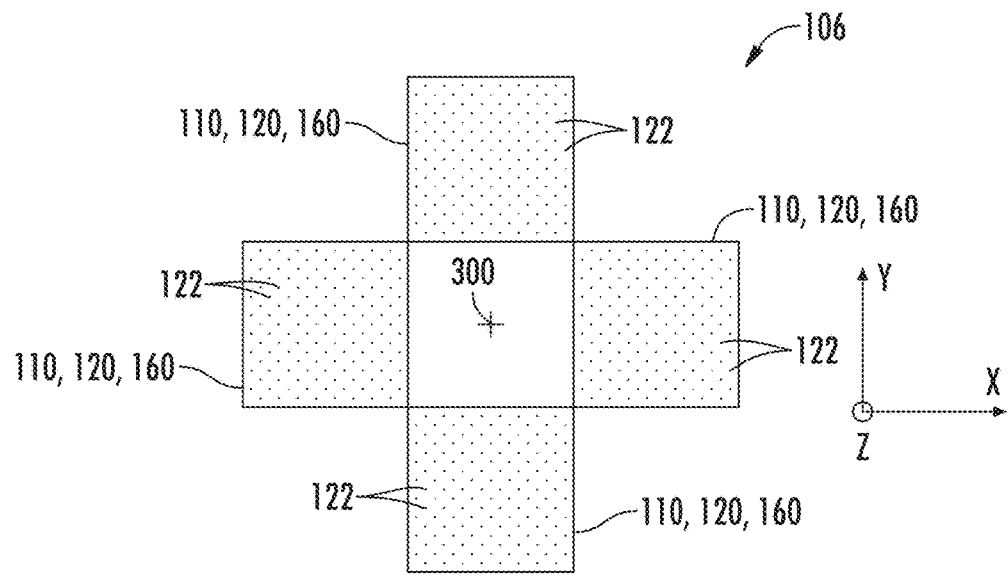
FIGS. 9A and 9B are respective top and side views of a seventh example embodiment of an electrospray thruster.
Figure 9B:
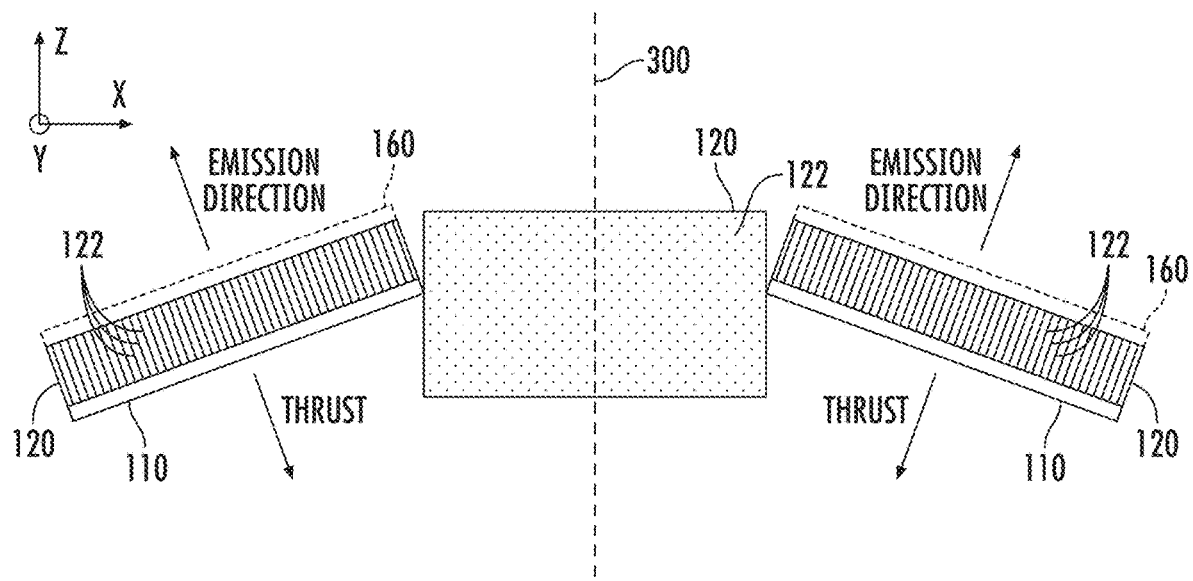

In FIGS. 9A and 9B, aspects of a further example embodiment of a thruster, generally designated 106, is provided, the thruster 106 having a plurality of (e.g., three, four, or five, or more, without limitation) dielectrics 120, each of which is in the form of a microfluidic chip, being solid and has one or more (e.g., a plurality of) channels 122 formed therein in the form of one or more (e.g., a plurality of) microcapillaries and, optionally, one or more surface cavities 124. In each dielectric 120, the channels 122 are open on the opposing first and second longitudinal ends thereof and have a length, or height, of about 100 µm to about 1000 µm and have a width of about 0.1 µm to about 10 µm and are capable of wicking a liquid via capillary action. In each dielectric 120, each channel 122 is open at a first end thereof with a reservoir 110 containing a liquid (e.g., 112, FIGS. 1, 4) on the upstream surface and open at a second end thereof to a corresponding (e.g., only one) surface cavity 124 formed in the downstream surface of the dielectric 120. In some embodiments, each dielectric 120 is formed with a dedicated reservoir 110 (e.g., in a monolithic, or unitary, manner). In some embodiments, the dielectrics 120 are both connected to a common, or shared, reservoir 110; in such embodiments, the two dielectrics 120 and the reservoir 110 can be formed as discrete components that are assembled together or in a monolithic, or unitary structure. In each dielectric 120, each surface cavity 124 can have a cross-sectional shape that is circular, a shape of a regular polygon, such as triangular, square, or hexagonal, or any other suitable shape, and can be tapered towards the corresponding channel 122. In each dielectric 120, each surface cavity 124 can have a width of about 1 µm to about 100 µm, a depth of about 1 µm to about 100 µm, and be centered and axially aligned with the corresponding channel 122. In each dielectric 120, a plurality of these channel-surface cavity pairs are arranged in an array that is a regular, periodic, random, or non-random arrangement. In some embodiments of the thruster 106, the downstream surface of each dielectric 120 is lined or coated with an electrically conductive layer functioning as a local, "on-chip" extraction grid 160, such that the extraction grid 160 is not spaced apart from (e.g., is in direct contact with) the downstream surface of the corresponding dielectric 120. Thus, the extraction distance is defined by the depth of the cavity 124. In some embodiments of the thruster 106, however, the extraction grid 160 associated with each dielectric 120 may be spaced apart from the downstream surface thereof by an extraction distance (d). In some embodiments of the thruster 106, the extraction grid 160 may be formed as a common, or shared (e.g., single), structure that is connected to an electrical ground; in some such embodiments, the extraction grid 160 can be spaced apart from the dielectrics 120 by an extraction distance (d).

As shown in FIGS. 9A and 9B, the thruster 106 is configured such that each of the dielectrics 120 is arranged about an axis 300, which extends in the z-direction. In the example shown, the dielectrics 120 are arranged about the axis 300 in diametrically opposing pairs. Thus, one dielectric 120 (e.g., the rightmost dielectric 120, as shown in FIG. 9A) of a first dielectric pair is inclined, relative to the x-y plane, towards the +x direction and the other dielectric 120 (e.g., the leftmost dielectric 120, as shown in FIG. 9A) of the first dielectric pair is inclined, relative to the x-y plane, towards the −x direction. Similarly, one dielectric 120 (e.g., the upper dielectric 120, as shown in FIG. 9A) of a second dielectric pair is inclined, relative to the x-y plane, towards the +y direction and the other dielectric 120 (e.g., the lower dielectric 120, as shown in FIG. 9A) of the second dielectric pair is inclined, relative to the x-y plane, towards the −y direction. Thus, the dielectrics 120 of the first dielectric pair are inclined in opposite directions relative to each other and the dielectrics 120 of the second dielectric pair are inclined in opposite directions relative to each other. Thus, the thruster 106 is configured for use as an electrospray colloidal thruster or as an electrospray ion thruster, in that each of the dielectrics 120 is placed edge-to-edge, or nearly edge-to-edge, with each dielectric 120 being oriented such that the downstream surface thereof is inclined at a small angle (e.g., about 5°, about 10°, about 15°, about 20°, about 30°, or about 45°) relative to the axis 300 and/or with respect to meeting edges of the dielectrics 120; in some such embodiments, the dielectrics form a generally pyramidal shape. As shown in FIG. 9B, the dielectrics are angled, relative to a horizontal plane (e.g., acting as an analogue for the surface to which the thruster 106 is attached), so as to protrude from the horizontal plane. In some embodiments, however, the arrangements of the dielectrics 120 of the thruster 106 can be reversed from that shown in FIG. 9B, such that each dielectric would be inclined to form a recessed region, relative to the horizontal plane, generally similar to the arrangement shown in FIG. 8B; such an arrangement can be advantageous in some instances because, rather than the thrusters 106 protruding out from the surface of the structure to which the thruster 106 is attached, in such embodiments, the recessed thruster would be less likely to be struck and/or damaged upon contact of the structure to which it is attached colliding with another object. Regardless of whether the thruster 106 is arranged as a protrusion or a recess, it is advantageous for each dielectric 120 to be configured for individual operation (e.g., activation, meaning emission of the IL propellant 112 from the channels 122 thereof), such that rotation of the thruster 106, as well as the structure to which the thruster 106 is attached, can be achieved about the x-axis and/or the y-axis depending on which of the dielectrics 120 is activated. According to this arrangement of the dielectrics 120 in the thruster 106, the opposing inclinations of the respective dielectrics 120 of the first and second dielectric pairs generates moments in opposite directions for angular rotation. One or both of the pairs of dielectrics 120 may be operated together, in which case the angular biases of the two oppositely inclined dielectrics 120 of a same pair of dielectrics 120 are effective to cancel the laterally-oriented angular acceleration vector components of the thrust generated by activation of each dielectric 120, such that a net translational thrust substantially coaxial with the axis 300 is generated. Thus, according to the example embodiment disclosed herein, the thruster 106 is operable to generate thrust in the pitch, yaw, and translation from a composite thruster. In some embodiments, at least all of the dielectrics 120 of the thruster 106 are formed as a monolithic, or unitary, structure. In the example embodiment shown in FIGS. 9A and 9B, each dielectric 120 is in fluidic communication with a discrete (e.g., separate) reservoir 110.

In some embodiments, each dielectric 120 is in fluidic communication with a common, or shared, reservoir 110.

In all of the thrusters disclosed herein, the dielectric(s) 120 thereof are formed as a microfluidic chip device, through which channels in the form of microcapillaries extend. These channels are entirely embedded within the dielectric 120 and are configured as emitters that do not protrude from an outermost geometric surface of the dielectric 120. As used herein, "outermost geometric surface" generally refers to the surface that defines the contours of the dielectric. For example, a known dielectric may have a generally planar or curved surface, beyond which the emitters protrude, such that the dielectric would have a spiked, or stepped, outer surface; in such a known dielectric, however, the surface from which the emitters protrude is herein defined as being the "outermost geometric surface" thereof, since this is the surface from which such emitters protrude.

The use of semiconductor materials like silicon in the dielectrics 120 of the thrusters disclosed herein is generally disadvantageous in comparison to dielectric materials like fused silica due to the comparatively higher electrical conductivity of silicon (1000 S/m) compared to that of fused silica ($5\times10^{-14}$ S/m). Thus, by using fused silica, the local electric field at the Taylor cone site is enhanced compared to the use of silicon. Another disadvantage associated with the use of silicon in the dielectrics 120 of any of the thrusters disclosed herein is that the dielectric constant of silicon is comparatively higher than the example dielectric materials disclosed herein; the use of dielectric materials with lower relative permittivity constants than silicon is advantageous because the electrospray onset voltage of the thrusters increases as a function of the relative permittivity of the dielectric material. Thus, by selecting a dielectric material with a relative permittivity lower than silicon, and preferably with a relative permittivity of about 2-7, inclusive, the electrospray onset voltage can be maintained at a value that allows for the thrusters disclosed herein to be used with power supplies currently in use with known electrospray emitters, thereby easing adoption of the thrusters disclosed herein.

Furthermore, in the thrusters disclosed herein, the respective extraction grids 160 are disclosed as being positioned such that no portion thereof is located vertically above (e.g., in the axial direction of) the channel-surface cavity pair. In some embodiments, the openings of the extraction grid are larger than and arranged concentrically around (e.g., so as to be substantially coaxial with) the corresponding channel-surface cavity pair.

According to the subject matter disclosed herein, the relationship between the electrospray onset voltage and the thickness of the dielectric is inversely proportional, meaning that an increase in the thickness of the dielectric generally results in a decrease in the electrospray onset voltage. The relationship between the electrospray onset voltage and the diameter, or width, of the electrospray emitter, or microcapillary, is proportional, meaning that an increase in the diameter of the electrospray emitter generally results in an increase in the electrospray onset voltage. The relationship between the electrospray onset voltage and the relative permittivity of the dielectric is proportional, meaning that an increase in the relative permittivity of the dielectric will generally result in an in increase in the electrospray onset voltage. The relationship between the electrospray onset voltage and the extraction distance is proportional, meaning that an increase in the extraction distance will generally result in an increase in the electrospray onset voltage. For a thruster comprising an array of electrospray emitters, the ratio of electrospray onset voltage for the array to the electrospray onset voltage for a single electrospray emitter is inversely proportional to the ratio of the pitch (p) between adjacent electrospray emitters to the height (h) of the electrospray emitters, such that this electrospray onset voltage ratio decreases (e.g., substantially asymptotically towards a ratio of 1:1) as this ratio of pitch-to-height increases.

Spacecraft and/or satellites, including cubesats, are disclosed herein. Such spacecraft and/or satellites may include one or more, or a plurality of, any of the thrusters disclosed herein without limitation.

A further advantage provided according to the thrusters disclosed herein is achieved by the use of channels, or microcapillaries, having high length:diameter ratios (e.g., of about 100:1 or greater, of about 150:1 or greater, or of about 200:1 or greater), such that the local electric field forming the Taylor cone is maximized and the electrospray onset voltage is minimized. This electric-field-enhancing effect of the Taylor cone is further enhanced by the use of a dielectric formed from an insulator with low relative permittivity.

Furthermore, unlike in some known electrospray emitter designs, the channels, or microcapillaries, open into a corresponding surface cavity formed on the downstream surface of the dielectric, but the outlet of the channel is flush with (e.g., does not protrude beyond) the floor of the corresponding surface cavity.

Unless defined otherwise, all technical and scientific terms used herein have the same meaning as commonly understood to one having ordinary skill in the art to which the presently disclosed subject matter belongs. Although, any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in this application, including the claims. Thus, for example, reference to "a vial" can include a plurality of such vials, and so forth.

Unless otherwise indicated, all numbers expressing quantities of length, diameter, width, and so forth used in the specification and claims are to be understood as being modified in all instances by the terms "about" or "approximately". Accordingly, unless indicated to the contrary, the numerical parameters set forth in this specification and attached claims are approximations that can vary depending upon the desired properties sought to be obtained by the presently disclosed subject matter.

As used herein, the terms "about" and "approximately," when referring to a value or to a length, width, diameter, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate for the disclosed apparatuses and devices.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and sub-combinations of A, B, C, and D.

The present subject matter can be embodied in other forms without departure from the spirit and essential characteristics thereof. The embodiments described therefore are to be considered in all respects as illustrative and not restrictive. Although the present subject matter has been described in terms of certain specific embodiments, other embodiments that are apparent to those of ordinary skill in the art are also within the scope of the present subject matter.

What is claimed is:

1. An electrospray thruster comprising:
   a reservoir containing a fluid;
   an electrospray emitter comprising:
      a dielectric comprising one or more channels formed through a thickness of the dielectric; and
      an extraction electrode, wherein the extraction electrode is positioned on an opposite side of the dielectric from the reservoir, in a direction of the thickness of the dielectric;
   wherein a first end of each of the one or more channels is in fluidic communication, at an upstream surface of the dielectric, with the fluid contained within the reservoir;
   wherein a second end of each of the one or more channels is in fluidic communication, at a downstream surface of the dielectric, with an external atmosphere surrounding the thruster;
   wherein the thruster is configured such that, when an electrospray onset voltage difference is applied between the extraction electrode and the fluid, mass from the fluid is ejected from the one or more channels to generate thrust;
   wherein the one or more channels are a plurality of channels arranged in an array, each of the channels being formed as a microcapillary with a length-to-width ratio of at least 100:1 and wherein a length of the channels is at least 100 μm;
   wherein the extraction electrode comprises an extraction grid;
   wherein the dielectric comprises, for each of the plurality of channels, a surface cavity that is formed as a recess extending into the dielectric from the downstream surface, each surface cavity being coaxial with one of the plurality of channels to form a channel-surface cavity pair;
   wherein the extraction grid comprises openings that are arranged such that each opening is positioned coaxial with a corresponding channel-surface cavity pair; and
   wherein each of the openings of the extraction grid have a diameter that is the same as, or greater than, a diameter of the corresponding surface cavity at the downstream surface of the dielectric.

2. The electrospray thruster of claim 1, wherein the fluid comprises an ionic liquid (IL) propellant.

3. The electrospray thruster of claim 1, wherein the dielectric comprises a dielectric material with a relative permittivity of less than 12.

4. The electrospray thruster of claim 1, wherein the electrospray onset voltage difference is less than 1,000 Volts (V).

5. The electrospray thruster of claim 1, wherein a spacing between adjacent channels in the array is from 0.5 to 3 times the length of the channels.

6. The electrospray thruster of claim 1, wherein the extraction grid comprises openings that are arranged such that each opening is positioned coaxial with a corresponding one of the plurality of channels.

7. The electrospray thruster of claim 1, wherein:
   for each channel, an extraction distance (d) is defined as a distance between the floor of the corresponding surface cavity and the extraction grid; and
   each corresponding surface cavity has a diameter (m) that is greater than 2 (d) to minimize an electrospray onset voltage and an applied voltage.

8. The electrospray thruster of claim 7, wherein the extraction grid is in direct contact with the downstream surface of the dielectric, in a manner of a conformal coating.

9. The electrospray thruster of claim 7, wherein the extraction grid is spaced apart from the downstream surface of the dielectric by a finite distance.

10. The electrospray thruster of claim 1, wherein the extraction grid is in direct contact with the downstream surface of the dielectric, in a manner of a conformal coating.

11. The electrospray thruster of claim 1, wherein the extraction grid is spaced apart from the downstream surface of the dielectric by a finite distance.

12. The electrospray thruster of claim 1, wherein the electrospray thruster comprises a monolithic construction.

13. A spacecraft and/or satellite comprising at least one electrospray thruster of claim 1, wherein:
   the at least one electrospray thruster is rigidly attached to an outer surface of the spacecraft and/or satellite; and
   the at least one electrospray thruster has a monolithic construction.

14. An electrospray thruster comprising:
   at least one reservoir containing a fluid;
   at least first and second electrospray emitters, each comprising:
      a dielectric comprising one or more channels formed through a thickness of the dielectric; and
      an extraction electrode, wherein the extraction electrode is positioned on an opposite side of the dielectric from the reservoir, in a direction of the thickness of the dielectric;
   wherein a first end of each of the channels is in fluidic communication, at an upstream surface of the dielectric, with the fluid contained within the reservoir; and wherein a second end of each of the channels is in fluidic communication, at a downstream surface of the dielectric, with an external atmosphere surrounding the thruster;

wherein the first and second electrospray emitters are arranged adjacent to each other on opposite sides of a plane and are inclined, relative to the plane perpendicular to a longitudinal direction, at opposite angles from each other;

wherein the first and second electrospray emitters are independently operable from each other; and wherein the thruster is configured such that:
when the first electrospray emitter is activated by applying an electrospray onset voltage difference between the extraction electrode of the first electrospray emitter and the fluid, the fluid is ejected from the channels of the first electrospray emitter to generate a first thrust, which has a vector inclined relative to the plane at a same angle as the first electrospray emitter; and when the second electrospray emitter is activated by applying the electrospray onset voltage difference between the extraction electrode of the second electrospray emitter and the fluid, the fluid is ejected from the channels of the second electrospray emitter to generate a second thrust, which has a vector inclined relative to the plane at a same angle as the second electrospray emitter.

15. The electrospray thruster of claim 14, wherein:
the fluid comprises an ionic liquid (IL) propellant;
when only the first electrospray emitter is activated, the electrospray thruster is configured to generate a net thrust that causes a rotational moment perpendicular to a first direction;
when only the second electrospray emitter is activated, the electrospray thruster is configured to generate a net thrust that causes a rotational moment perpendicular to a second direction, which is opposite the first direction, relative to an axis of rotation; and
when both the first and second electrospray emitters are activated, the electrospray thruster is configured to generate a net thrust that is substantially in the longitudinal direction with zero rotational moment.

16. An electrospray thruster comprising:
at least one reservoir containing a fluid;
at least first, second, third, and fourth electrospray emitters, each comprising:
a dielectric comprising one or more channels formed through a thickness of the dielectric; and
an extraction electrode, wherein the extraction electrode is positioned on an opposite side of the dielectric from the reservoir, in a direction of the thickness of the dielectric;
wherein a first end of each of the channels is in fluidic communication, at an upstream surface of the dielectric, with the fluid contained within the reservoir; and
wherein a second end of each of the channels is in fluidic communication, at a downstream surface of the dielectric, with an external atmosphere surrounding the thruster;

wherein the first, second, third, and fourth electrospray emitters are substantially uniformly arranged about a longitudinal axis;

wherein the first and third electrospray emitters define a first electrospray emitter pair and are radially spaced apart from each other by about 180°, such that the first and third electrospray emitters are on opposite sides of the longitudinal axis from each other, and are inclined, relative to a plane that is perpendicular to the longitudinal axis, at opposite angles from each other;

wherein the second electrospray emitter is radially spaced apart from the first and third electrospray emitters by about 90°;

wherein the second and fourth electrospray emitters define a second electrospray emitter pair and are radially spaced apart from each other by about 180°, such that the second and fourth electrospray emitters are on opposite sides of the longitudinal axis from each other, and are inclined, relative to the plane that is perpendicular to the longitudinal axis, at opposite angles from each other;

wherein each of the first, second, third, and fourth electrospray emitters are independently operable from each other; and wherein the thruster is configured such that:
when the first electrospray emitter is activated by applying an electrospray onset voltage difference between the extraction electrode of the first electrospray emitter and the fluid, the fluid is ejected from the channels of the first electrospray emitter to generate a first thrust, which has a vector inclined relative to the longitudinal axis at a same angle as the first electrospray emitter;

when the second electrospray emitter is activated by applying the electrospray onset voltage difference between the extraction electrode of the second electrospray emitter and the fluid, the fluid is ejected from the channels of the second electrospray emitter to generate a second thrust, which has a vector inclined relative to the longitudinal axis at a same angle as the second electrospray emitter;

when the third electrospray emitter is activated by applying the electrospray onset voltage difference between the extraction electrode of the third electrospray emitter and the fluid, the fluid is ejected from the channels of the third electrospray emitter to generate a third thrust, which has a vector inclined relative to the longitudinal axis at a same angle as the third electrospray emitter; and when the fourth electrospray emitter is activated by applying the electrospray onset voltage difference between the extraction electrode of the fourth electrospray emitter and the fluid, the fluid is ejected from the channels of the fourth electrospray emitter to generate a fourth thrust, which has a vector inclined relative to the longitudinal axis at a same angle as the fourth electrospray emitter.

17. The electrospray thruster of claim 16, wherein:
the fluid comprises an ionic liquid (IL) propellant;
when only the first electrospray emitter is activated, the electrospray thruster is configured to generate a net thrust that causes a rotational moment perpendicular to a first direction;
when only the second electrospray emitter is activated, the electrospray thruster is configured to generate a net thrust that causes a rotational moment perpendicular to a second direction, which is oriented at about 90° relative to the first direction, relative to the longitudinal axis;
when only the third electrospray emitter is activated, the electrospray thruster is configured to generate a net thrust that causes a rotational moment perpendicular to a third direction, which is opposite the first direction, relative to the longitudinal axis;

when only the fourth electrospray emitter is activated, the electrospray thruster is configured to generate a net thrust that causes a rotational moment perpendicular to a fourth direction, which is opposite the second direction, relative to the longitudinal axis; and when both the first and third electrospray emitters are activated and/or when both the second and fourth electrospray emitters are activated, the electrospray thruster is configured to generate a net thrust that is substantially in a longitudinal direction.

18. The electrospray thruster of claim 17, wherein:

the first direction is a positive yaw direction, the second direction is a positive pitch direction, the third direction is a negative yaw direction, and the fourth direction is a negative pitch direction; and the electrospray thruster is configured to control yaw, pitch, and translator movements.

19. The electrospray thruster of claim 16, wherein:

the electrospray onset voltage difference is less than 1,000 Volts (V);

each of the channels for the first, second, third, and fourth electrospray emitters is formed as a microcapillary with a length-to-width ratio of at least 100:1; and the extraction electrode of each of the first, second, third, and fourth electrospray emitters is an extraction grid comprising a plurality of openings, each opening being substantially coaxial with one of the channels on a same electrospray emitter.

20. A spacecraft and/or satellite comprising at least one electrospray thruster of claim 16, wherein:

the at least one electrospray thruster is rigidly attached to an outer surface of the spacecraft and/or satellite; and the first, second, third, and fourth electrospray emitters have a monolithic construction and either:

the at least one electrospray thruster is in a form of a recess extending inwardly from the outer surface of the spacecraft and/or satellite; or the at least one electrospray thruster is in a form of a protrusion extending outwardly from the outer surface of the spacecraft and/or satellite.

* * * * *